US012766673B2

(12) United States Patent
Chen

(10) Patent No.: US 12,766,673 B2
(45) Date of Patent: Oct. 20, 2026

(54) UNIVERSAL ADJUSTABLE WRENCH

(71) Applicant: Chiung Ju Chen, Taichung City (TW)

(72) Inventor: Chiung Ju Chen, Taichung City (TW)

(*) Notice: Subject to any disclaimer, the term of this patent is extended or adjusted under 35 U.S.C. 154(b) by 266 days.

(21) Appl. No.: 18/773,187

(22) Filed: Jul. 15, 2024

(65) Prior Publication Data

US 2026/0014675 A1 Jan. 15, 2026

(51) Int. Cl.
*B25B 13/14* (2006.01)
*B25B 13/06* (2006.01)
*B25B 23/00* (2006.01)

(52) U.S. Cl.
CPC .............. *B25B 13/14* (2013.01); *B25B 13/06* (2013.01); *B25B 23/0014* (2013.01)

(58) Field of Classification Search
CPC ....... B25B 13/06; B25B 13/14; B25B 13/146; B25B 13/5058; B25B 23/0014
USPC .................................................... 81/126, 129
See application file for complete search history.

(56) References Cited

U.S. PATENT DOCUMENTS 6,857,341 B1 * 2/2005 Cheng .................... B25G 1/063 81/177.8
11,389,932 B2 * 7/2022 Ortiz ....................... B25B 13/16
2004/0060398 A1 * 4/2004 Hsien ..................... B25G 1/063 81/177.7

* cited by examiner

*Primary Examiner* — Hadi Shakeri
(74) *Attorney, Agent, or Firm* — LANWAY IPR SERVICES; Chun-Ming Shih

(57) ABSTRACT

A universal adjustable wrench includes a wrench body, a worm, and a movable jaw. The wrench body includes a handle and a first jaw head. The first jaw head has a worm groove and a slide surface. The slide surface has a rail groove and a fixed jaw having a first gripping surface. The worm is pivotally connected in the worm groove. The movable jaw is connected to the rail groove, and has a rack and a jaw body. The jaw body has a second gripping surface and a guide surface. The second gripping surface defines a gripping alignment line and a gripping opening inclination. The second gripping surface includes a biting surface section having at least two biting teeth and an anti-slip surface section having a plurality of anti-slip teeth. The wrench has a quick-release or quick-lock function, without wearing the corners of workpieces.

6 Claims, 22 Drawing Sheets

UNIVERSAL ADJUSTABLE WRENCH

FIELD OF THE INVENTION

The present invention relates to a universal adjustable wrench that can be used for various specifications and types of rods and pipe fittings, and is also suitable for hexagonal screw workpieces, and has a quick-release or quick-lock function, without wearing the corners of workpieces.

BACKGROUND OF THE INVENTION

A wrench is a hand tool that uses the principle of leverage to grip and turn bolts, nuts, and other workpieces that are difficult to turn by hand. In general, a wrench has a jaw opening at either or both ends of the handle for gripping a workpiece. When in use, the user applies an external force at the other end of the handle in the direction of rotation to turn the workpiece. Adjustable wrenches are widely used because the jaw opening can be adjusted in size.

As shown in FIG. 1 and FIG. 2, an adjustable wrench consists of a handle 10, a fixed jaw 20, and a movable jaw 30. The fixed jaw 20 is integrally formed with the top of the handle 10. A rotatable worm 40 is transversely provided. The movable jaw 30 is movably disposed on the top of the handle 10 and can be moved closer to or away from the fixed jaw 20 to adjust the distance between the movable jaw 30 and the fixed jaw 20. Further, the bottom of the movable jaw 30 has a rack 31 meshing with the worm 40. This allows the user to adjust the opening between the movable jaw 30 and the fixed jaw 20 by rotating the worm 40, thereby gripping a retained workpiece such as a nut or bolt for tightening or loosening operations. The conventional wrench can be used for turning workpieces in different sizes and specifications. As shown in FIG. 3, when the workpiece 50 is turned by the wrench, due to the margin (fit tolerance) of the mesh between the rack 31 of the movable jaw 30 and the worm 40, the workpiece 50 will be turned in the “expanded” jaw opening in the beginning of turning the workpiece 50. This may cause wear on the corners of the workpiece 50 easily. When the workpiece is turned frequently, the corners of the workpiece will suffer a lot of worn. This will affect the operations of the wrench. Besides, after the handle 10 turns the workpiece 50 to an angle, as shown in FIG. 4 and FIG. 5, it is necessary to move the wrench away from the workpiece 50, and then the workpiece 50 is gripped and turned again. It is time-consuming and labor-intensive to loosen or tighten the workpiece 50.

SUMMARY OF THE INVENTION

The primary object of the present invention is to provide a universal adjustable wrench, comprising a wrench body, a worm, and a movable jaw.

The wrench body includes a handle and a first jaw head at one end of the handle. A worm groove is defined in the first jaw head. A slide surface is formed on a front end of the first jaw head. The slide surface has a rail groove that is tangent to the worm groove. A fixed jaw is formed on one end of the slide surface. The fixed jaw has a first gripping surface perpendicular to the slide surface. A gripping depth is defined from the outermost point of the first gripping surface to the slide surface.

The worm is pivotally connected in the worm groove.

The movable jaw has a guide plate portion inserted in the rail groove. A jaw body extending outwardly relative to the slide surface is formed on one end of the guide plate portion.

A rack meshing with the worm is formed on the other end of the guide plate portion. The worm is rotatable to drive the jaw body to move along the slide surface closer to or away from the fixed jaw. The distance between the outermost end of the jaw body and the slide surface is defined as a jaw body height. The jaw body height is equivalent to the gripping depth. The jaw body has a second gripping surface and a guide surface relative to the first gripping surface. A jaw opening is defined between the second gripping surface and the first gripping surface. A line that passes through the intersection of the second gripping surface and the slide surface and is parallel to the first gripping surface is defined as a gripping opening reference line. A gripping alignment line is defined on the second gripping surface. The angle between the gripping alignment line and the gripping opening reference line is 13 degrees to 16 degrees, which is defined as a gripping opening inclination. The gripping surface length of the second gripping surface is 0.65 to 0.9 times the jaw body height. The guide surface intersects the outermost end of the jaw body. The angle between the guide surface and the gripping alignment line is defined as a guide angle. The guide angle is 30 degrees to 75 degrees. Further, the second gripping surface includes a biting surface section and an anti-slip surface section that are arranged in sequence in an outside-in direction. The biting surface section has at least two biting teeth that are connected in sequence and extend laterally. The biting teeth each have a tip. The distance between the tips of every adjacent two of the biting teeth is defined as a tooth pitch. The tips of the biting teeth are aligned with the gripping alignment line. A line perpendicular to the gripping alignment line at the tip is defined as a tooth profile reference line. The biting teeth each have a root. A line extending along the roots of the biting teeth is defined as a root line. The root line is parallel to the gripping alignment line. The distance between the gripping alignment line and the root line is defined as a tooth height. The tooth pitch is 1.5 mm to 3 mm, which is 1.5 to 3 times the tooth height. The biting teeth each have a back face extending and inclining outwardly from the tip to the root line and a front face extending and inclining inwardly from the tip to the root line. The angle between the back face and the tooth profile reference line is defined as a tooth back inclination. The angle between the front face and the tooth profile reference line is defined as a tooth height inclination. The tooth back inclination is more than 1.25 times the tooth height inclination. The anti-slip surface section is connected to the biting surface section. The anti-slip surface section has a plurality of anti-slip teeth that are connected in sequence and extend laterally. The anti-slip teeth each have a tip. The tips of the anti-slip teeth are aligned with the gripping alignment line. The anti-slip teeth each have a tooth profile approximately equivalent to that of the biting teeth. The anti-slip teeth have a tooth pitch and a tooth height. The tooth pitch and the tooth height of the anti-slip teeth are two-fifths to three-fifths of the tooth pitch and the tooth height of the biting teeth, respectively.

When in use, the first gripping surface and the second gripping surface of the fixed jaw and the jaw body of the movable jaw grip a workpiece together, i.e., in the figure, a round pipe workpiece is gripped as an example. When the user holds the handle of the wrench and operates the first jaw head to turn the workpiece and applies thrust toward the workpiece, the gripping opening inclination of the second gripping surface will provide a compressing and tightening effect, that is, the anti-slip teeth of the anti-slip surface section and/or the biting teeth of the biting surface section will drive the workpiece to rotate. After the workpiece is turned by an angle, the jaw opening will retreat from the workpiece, stopping the turning of the workpiece. The first jaw head may be swung back by the handle without applying thrust to the workpiece, and then continue to turn the workpiece. The worm can be rotated to adjust the jaw opening. The wrench can be used to turn various rod-shaped or pipe-shaped workpieces, regardless of whether the cross-section of the workpiece is round, polygonal or other special shape. This operating mode may be applied to bolt/nut workpieces with severely worn corners. The workpiece can be disassembled or loosened effectively. In general, for the hexagonal bolt/nut workpiece with normal corners, the first jaw head is moved forward, and the first gripping surface and the second gripping surface grip two opposite sides of the workpiece. The corner of the workpiece will be received in the tooth gap between two of the biting teeth of the biting surface section. That is, the tips of two of the biting teeth are against the side of the workpiece and the corner of the workpiece is against the back face, thereby forming two supports. When the first jaw head is turned, the first gripping surface and the second gripping surface grip the two sides of the workpiece, that is, the biting surface section bites the corner of the workpiece to turn, without slipping or wearing. Besides, the first jaw head can be swung back by the handle at any angle. Then, the biting teeth of the biting surface section are disengaged from the corner of the workpiece, and the intersection of the biting surface section and the guide surface is moved along the side of the workpiece, and the first gripping surface passes through the corner on the other side of the workpiece smoothly to another adjacent side, returning to the initial gripping state. There is no need for the jaw opening of the wrench to retreat from the workpiece, and the workpiece can be disassembled or locked quickly. The wrench may be used to turn or disassemble various rod-shaped or pipe-shaped workpieces or bolt/nut work-pieces with worn corners. When the wrench is used to turn normal hexagonal bolt/nut workpieces with unworn corners, it has a quick-release or quick-lock function, without wear-ing corners.

Preferably, the tooth pitch of every adjacent two of the biting teeth of the biting surface section is 2 mm to 2.5 mm. The tooth height of the biting teeth is 0.65 mm to 0.85 mm. The tooth back inclination is 60 degrees to 70 degrees. The biting surface section has good ability to bite and turn the corner of various hexagonal bolt/nut workpieces.

Preferably, the gripping surface length of the second gripping surface is 0.75 to 0.85 times the jaw body height. The anti-slip surface section is 3 to 3.5 times the biting surface section in length. The biting surface section is configured to bite and turn the corner of a hexagonal bolt/nut. There is no need for the worm to adjust the jaw opening. As long as the rod-shaped or pipe-shaped work-piece is in the jaw opening, it can be turned effectively.

Preferably, the gripping opening inclination of the second gripping surface is 14 degrees to 15 degrees. Thus, when the first jaw head is pushed forward toward the rod-shaped or pipe-shaped workpiece, the first gripping surface and the second gripping surface provide a compressing and tight-ening effect.

Preferably, a second jaw head is provided at the other end of the handle of the wrench body. The second jaw head is horseshoe-shaped and has a U-shaped notch. A socket con-nector is pivotally connected to the U-shaped notch. One end of the socket connector has a pivot portion that is pivotally connected to the U-shaped notch. The other end of the socket connector has a socket connecting portion. The socket connector can be pivoted on the second jaw head, and a socket is connected to the socket connecting portion so that the wrench can be used as a socket wrench.

Preferably, the second gripping surface of the jaw body of the movable jaw faces the first gripping surface of the fixed jaw. The jaw body further has a third gripping surface facing away from the first gripping surface, that is, the third gripping surface is opposite to the second gripping surface. The third gripping surface is parallel to the first gripping surface. When the guide plate portion of the movable jaw is inserted in the guide groove and the rack meshes with the worm, the third gripping surface is selected to face the first gripping surface. The worm is rotatable to drive the jaw body to move along the slide surface closer to or away from the fixed jaw, thereby adjusting the jaw opening between the first gripping surface and the third gripping surface, such that the wrench may be used as an open-end adjustable wrench.

DETAILED DESCRIPTION OF THE PREFERRED EMBODIMENTS

Embodiments of the present invention will now be described, by way of example only, with reference to the accompanying drawings.

Figure 1:
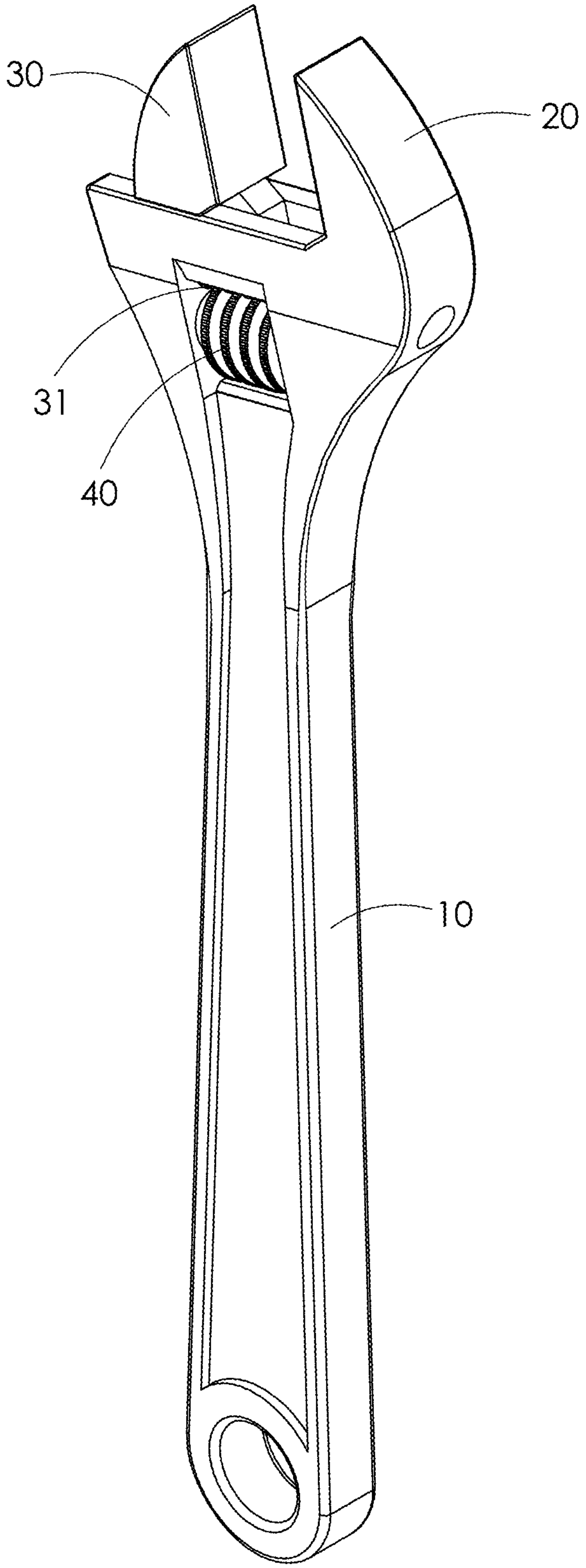
PRIOR ART FIG. 1
FIG. 1 is a perspective view of a conventional adjustable wrench.
Figure 2:
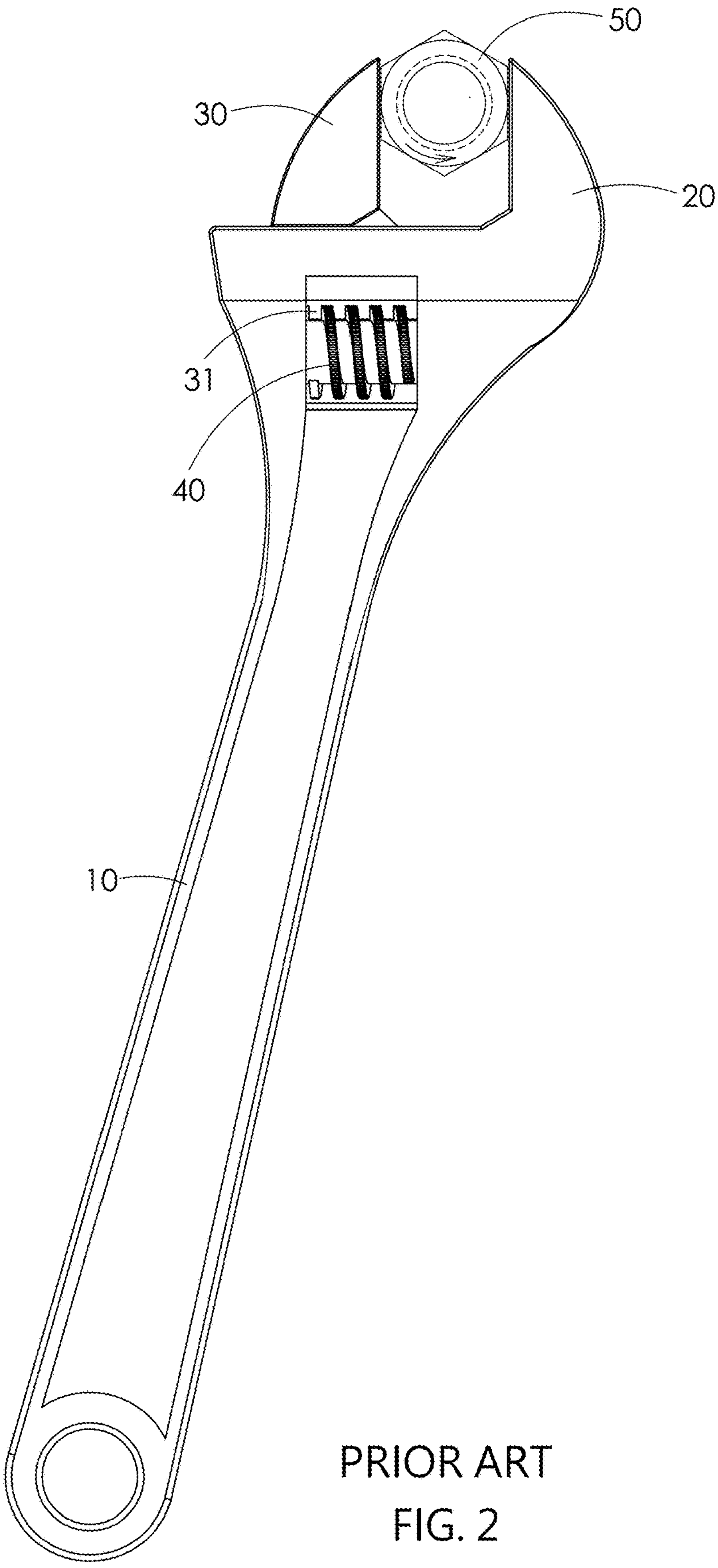
PRIOR ART FIG. 2
FIG. 2 is a schematic view of the conventional adjustable wrench, wherein a workpiece is gripped by the conventional adjustable wrench.
Figure 3:
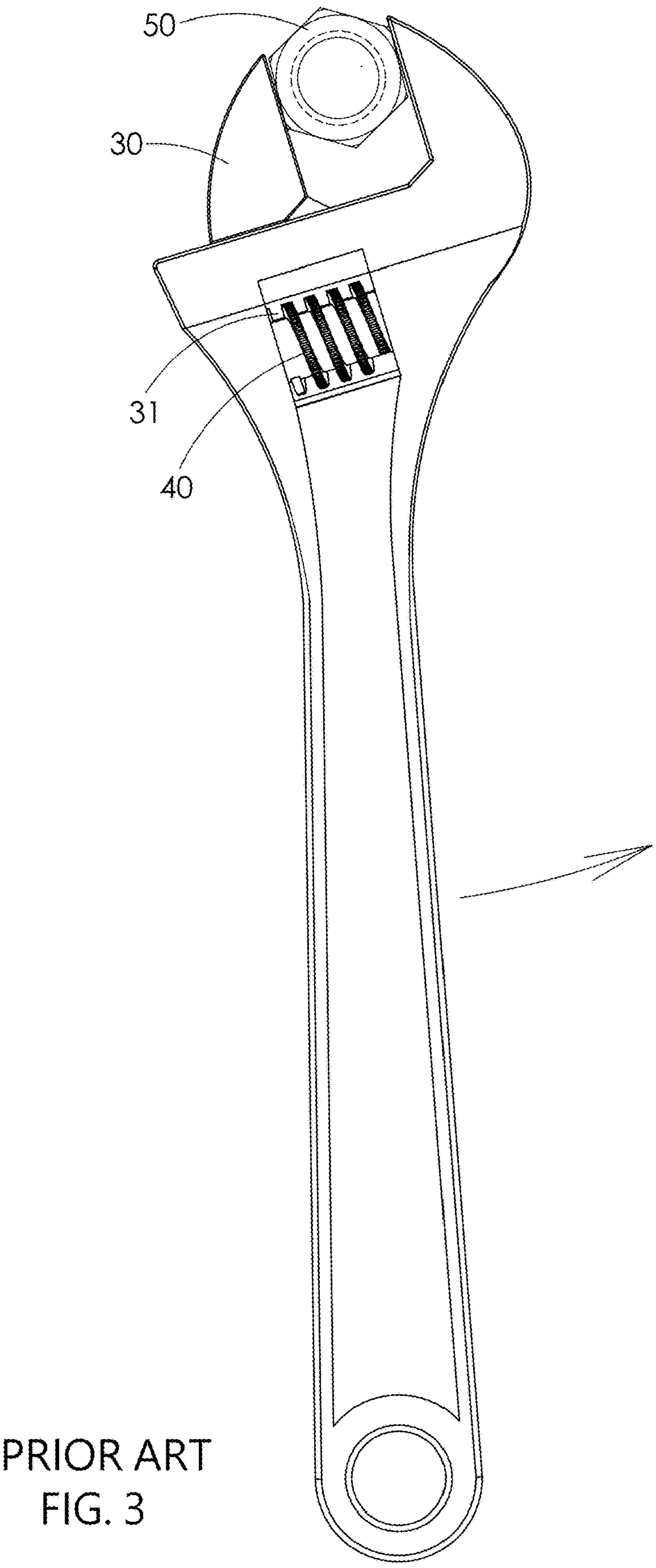
PRIOR ART FIG. 3
FIG. 3 is a schematic view of the conventional adjustable wrench, wherein the workpiece is turned by the conven-tional adjustable wrench.
Figure 4:
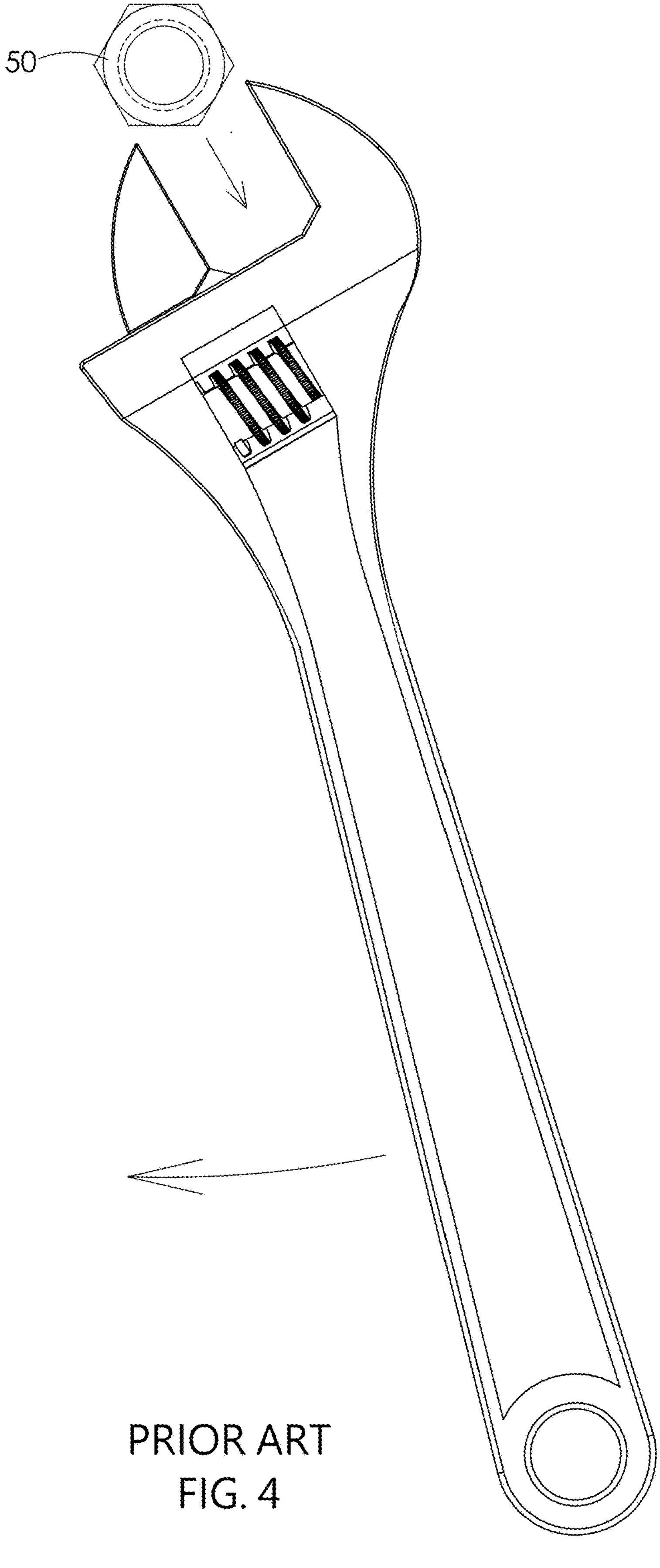
PRIOR ART FIG. 4
FIG. 4 is a schematic view of the conventional adjustable wrench, wherein the conventional adjustable wrench is moved away from the workpiece after the workpiece is turned to an angle.
Figure 5:
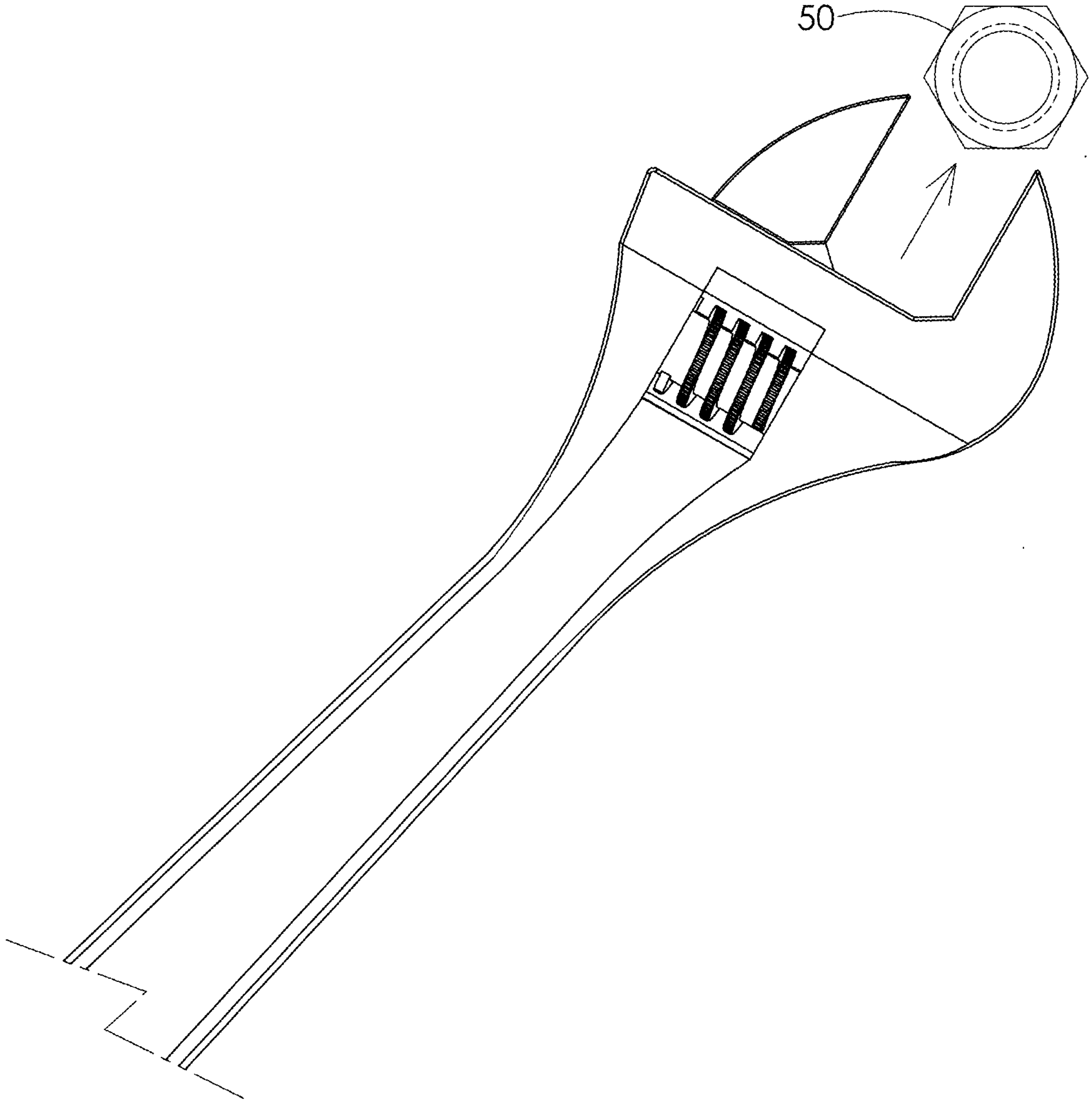
PRIOR ART FIG. 5
FIG. 5 is a schematic view of the conventional adjustable wrench, wherein the conventional adjustable wrench is moved to grip the workpiece again after the workpiece is turned to an angle.
Figure 6:
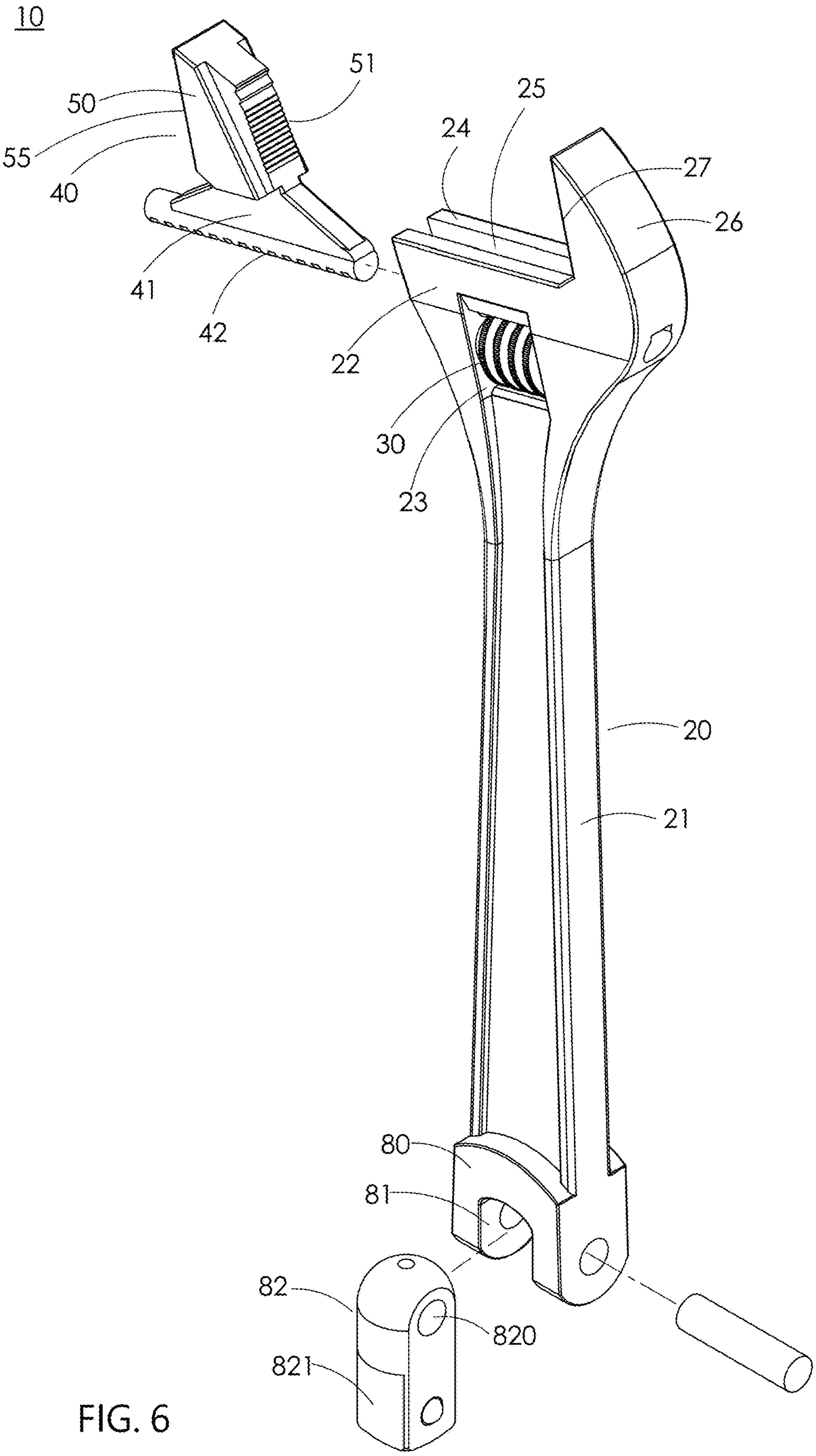
FIG. 6 is an exploded view of the present invention.
Figure 7:
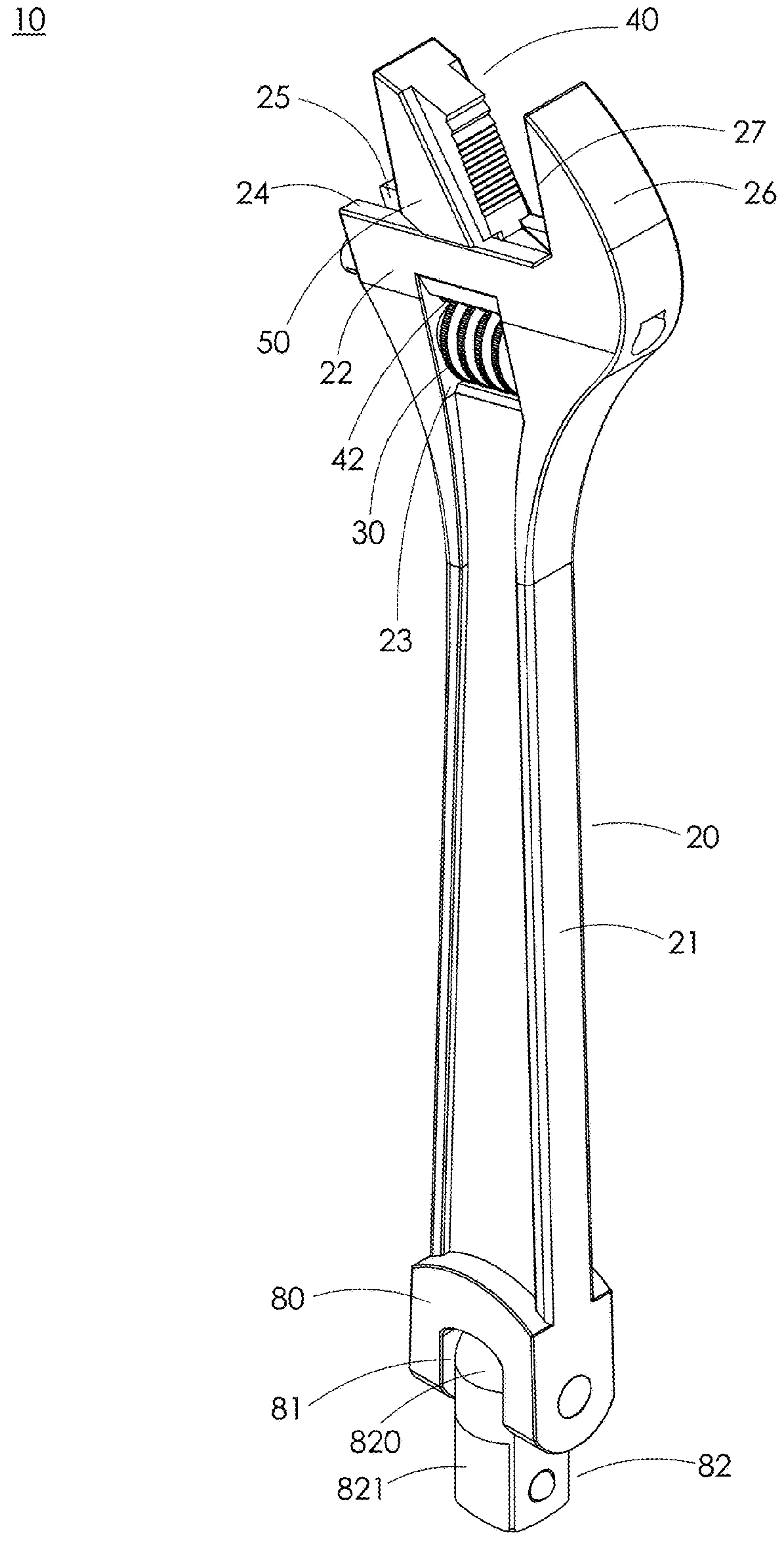
FIG. 7 is a perspective view of the present invention.
Figure 8:
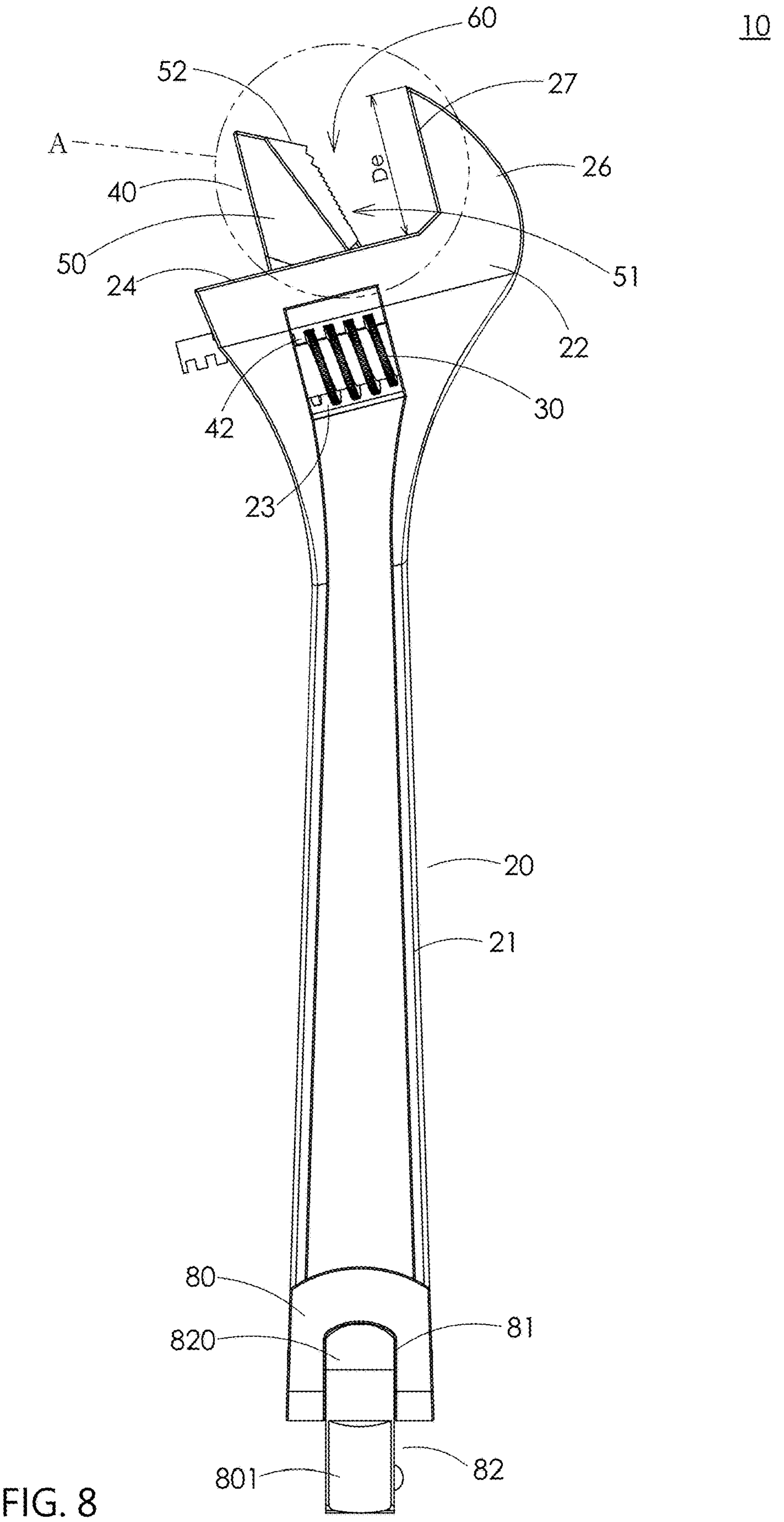
FIG. 8 is a planar view of the present invention.

A universal adjustable wrench 10, as shown in FIG. 6, FIG. 7, and FIG. 8, comprises a wrench body 20, a worm 30, and a movable jaw 40.

The wrench body 20 includes a handle 21 and a first jaw head 22 at one end of the handle 21. A worm groove 23 is defined in the first jaw head 22. A slide surface 24 is formed on a front end of the first jaw head 22. The slide surface 24 has a rail groove 25 that is tangent to the worm groove 23. A fixed jaw 26 is formed on one end of the slide surface 24. The fixed jaw 26 has a first gripping surface 27 perpendicular to the slide surface 24. A gripping depth De is defined from the outermost point of the first gripping surface 27 to the slide surface 24.

The worm 30 is pivotally connected in the worm groove 23.

Figure 9:
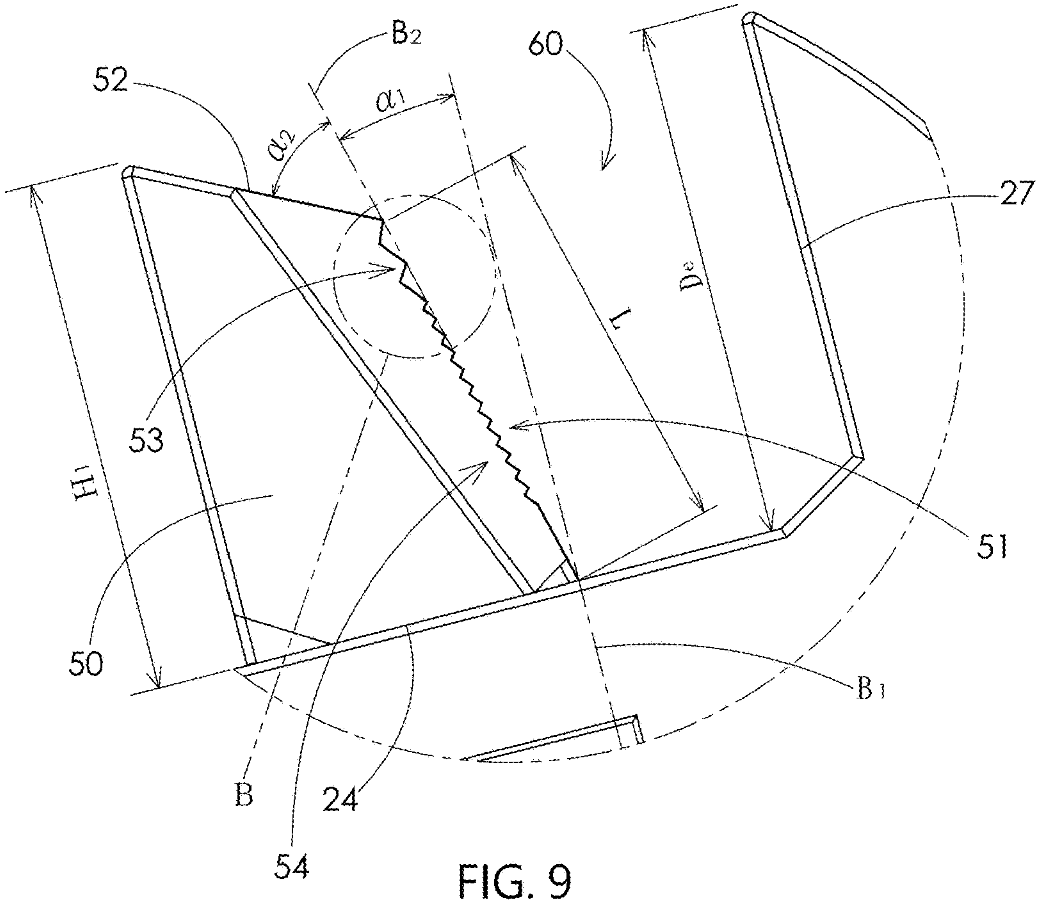
FIG. 9 is an enlarged view of circle A in FIG. 8.
Figure 10:
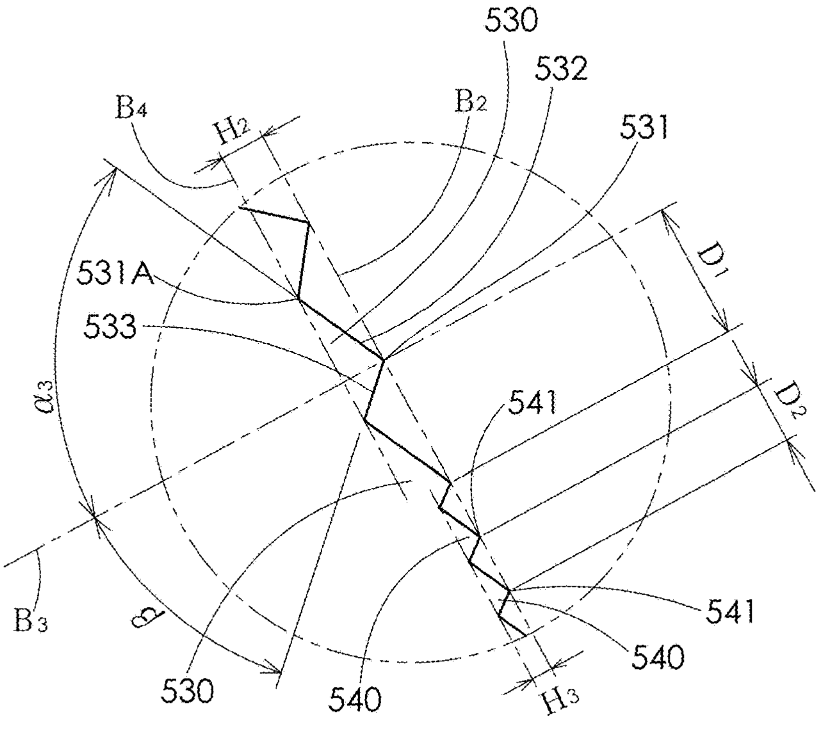
FIG. 10 is an enlarged view of circle B in FIG. 9.

The movable jaw 40 has a guide plate portion 41 inserted in the rail groove 25. A jaw body 50 extending outwardly relative to the slide surface 24 is formed on one end of the guide plate portion 41. A rack 42 meshing with the worm 30 is formed on the other end of the guide plate portion 41. The worm 30 is rotatable to drive the jaw body 50 to move along the slide surface 24 closer to or away from the fixed jaw 26. As shown in FIG. 8, FIG. 9, and FIG. 10, the distance between the outermost end of the jaw body 50 and the slide surface 24 is defined as a jaw body height $H_1$. The jaw body height $H_1$ is equivalent to the gripping depth De. The jaw body 50 has a second gripping surface 51 and a guide surface 52 relative to the first gripping surface 27. A jaw opening 60 is defined between the second gripping surface 51 and the first gripping surface 27. A line that passes through the intersection of the second gripping surface 51 and the slide surface 24 and is parallel to the first gripping surface 27 is defined as a gripping opening reference line $B_1$. A gripping alignment line $B_2$ is defined on the second gripping surface 51. The angle between the gripping alignment line $B_2$ and the gripping opening reference line $B_1$ is 13 degrees to 16 degrees, which is defined as a gripping opening inclination $\alpha_1$. The gripping surface length L of the second gripping surface 51 is 0.65 to 0.9 times the jaw body height $H_1$. The guide surface 52 intersects the outermost end of the jaw body 50. The angle between the guide surface 52 and the gripping alignment line $B_2$ is defined as a guide angle $\alpha_2$. The guide angle $\alpha_2$ is 30 degrees to 75 degrees. Further, the second gripping surface 51 includes a biting surface section 53 and an anti-slip surface section 54 that are arranged in sequence in an outside-in direction. The biting surface section 53 has at least two biting teeth 530 that are connected in sequence and extend laterally. The biting teeth 530 each have a tip 531. The distance between the tips 531 of every adjacent two of the biting teeth 530 is defined as a tooth pitch $D_1$. The tips 531 of the biting teeth 530 are aligned with the gripping alignment line $B_2$. A line perpendicular to the gripping alignment line $B_2$ at the tip 531 is defined as a tooth profile reference line $B_3$. The biting teeth 530 each have a root 531A. A line extending along the roots of the biting teeth 530 is defined as a root line $B_4$. The root line $B_4$ is parallel to the gripping alignment line $B_2$. The distance between the gripping alignment line $B_2$ and the root line $B_4$ is defined as a tooth height $H_2$. The tooth pitch $D_1$ is 1.5 mm to 3 mm, which is 1.5 to 3 times the tooth height $H_2$. The biting teeth 530 each have a back face 532 extending and inclining outwardly from the tip 531 to the root line $B_4$ and a front face 533 extending and inclining inwardly from the tip 531 to the root line $B_4$. The angle between the back face 532 and the tooth profile reference line $B_3$ is defined as a tooth back inclination $\alpha_3$. The angle between the front face 533 and the tooth profile reference line $B_3$ is defined as a tooth height inclination $\beta$. The tooth back inclination $\alpha_3$ is more than 1.25 times the tooth height inclination $\beta$. The anti-slip surface section 54 is connected to the biting surface section 53. The anti-slip surface section 54 has a plurality of anti-slip teeth 540 that are connected in sequence and extend laterally. The anti-slip teeth 540 each have a tip 541. The tips 541 of the anti-slip teeth 540 are aligned with the gripping alignment line $B_2$. The anti-slip teeth 540 each have a tooth profile approximately equivalent to that of the biting teeth 530. The anti-slip teeth 540 have a tooth pitch $D_2$ and a tooth height $H_3$. The tooth pitch $D_2$ and the tooth height $H_3$ of the anti-slip teeth 540 are two-fifths to three-fifths of the tooth pitch $D_1$ and the tooth height $H_2$ of the biting teeth 530, respectively.

Figure 11:
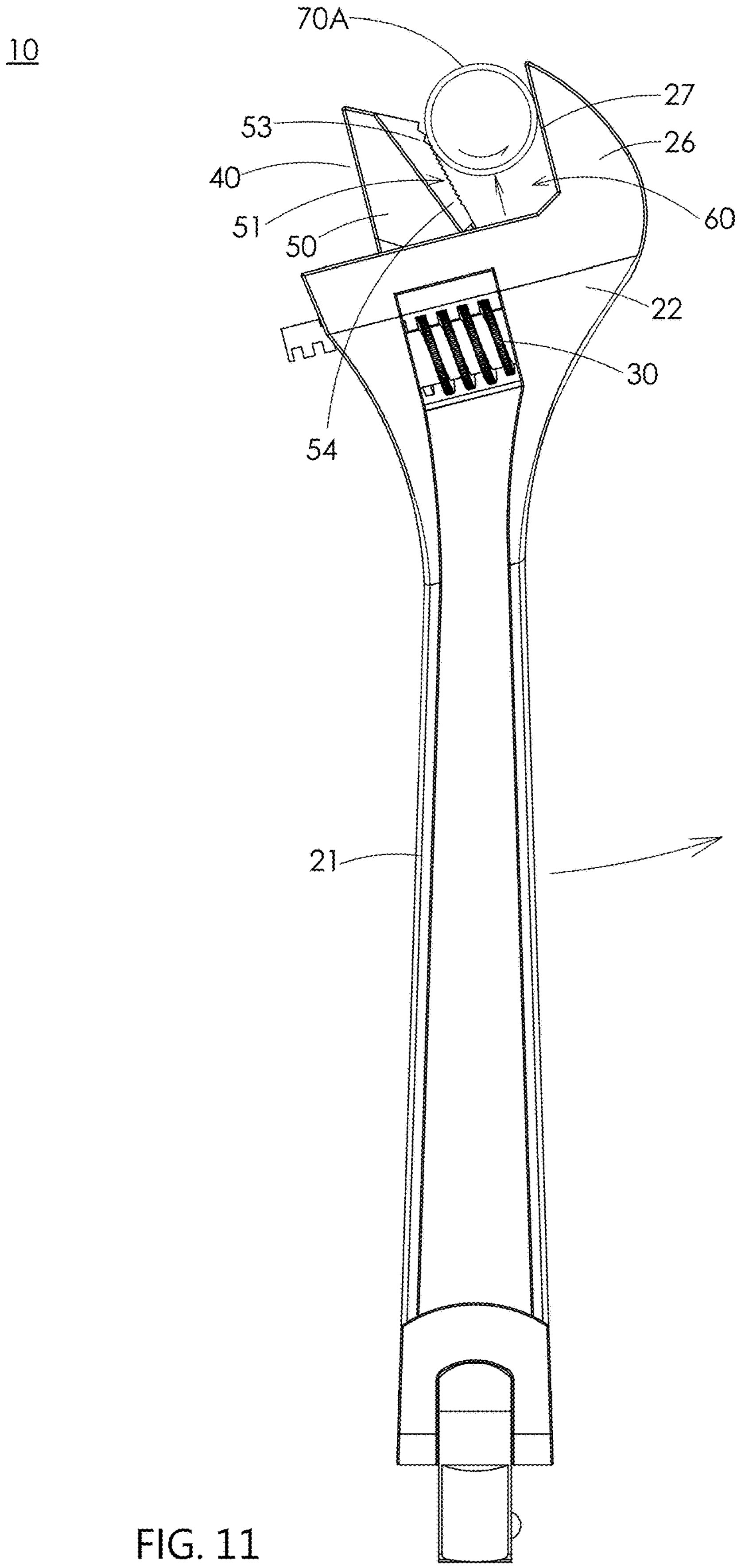
FIG. 11 is a schematic view of the present invention, wherein a round pipe workpiece is gripped and turned by the wrench.
Figure 12:
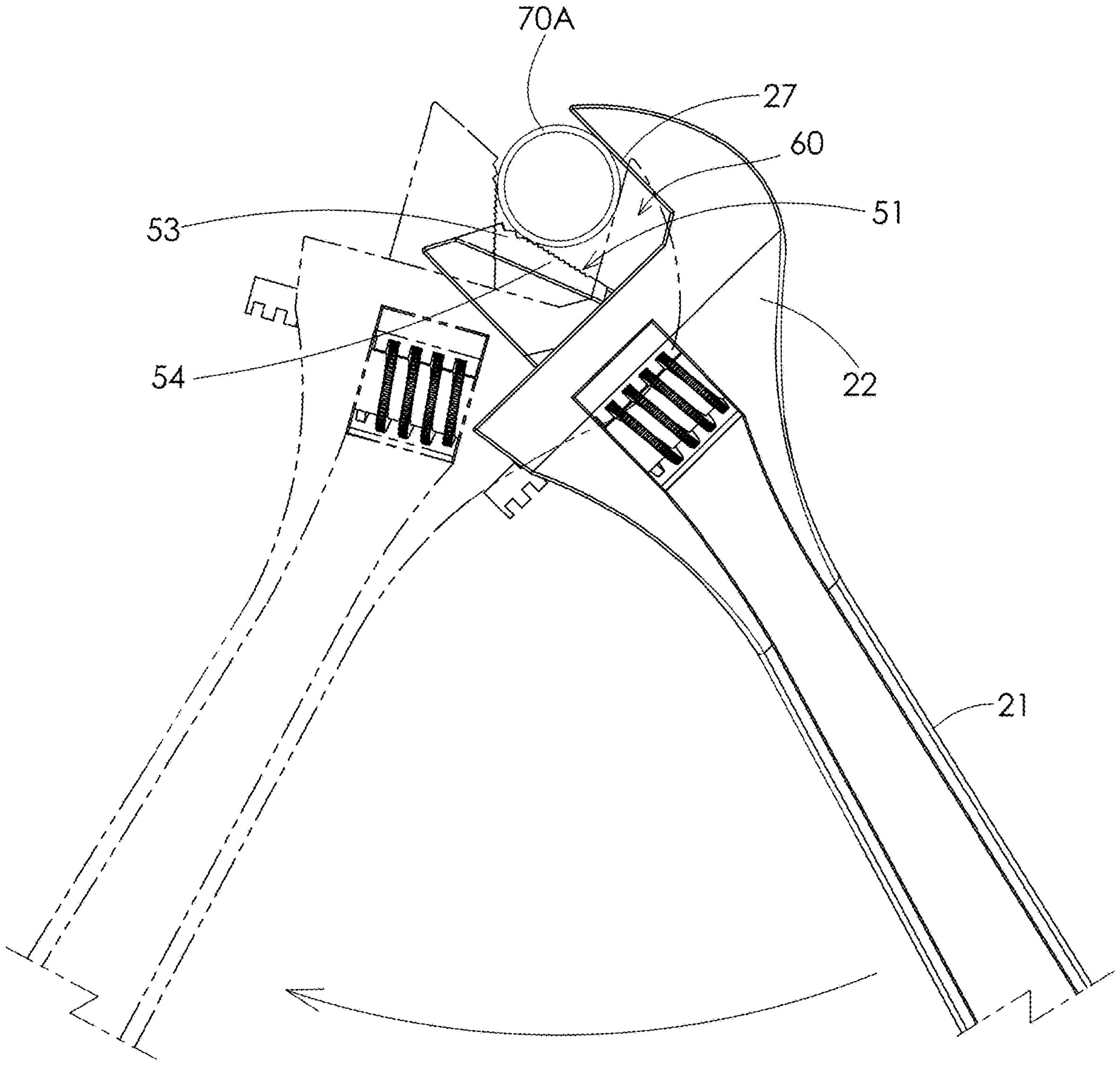
FIG. 12 is a schematic view of the present invention, wherein the wrench is swung back after the round pipe workpiece is turned by an angle.
Figure 13:
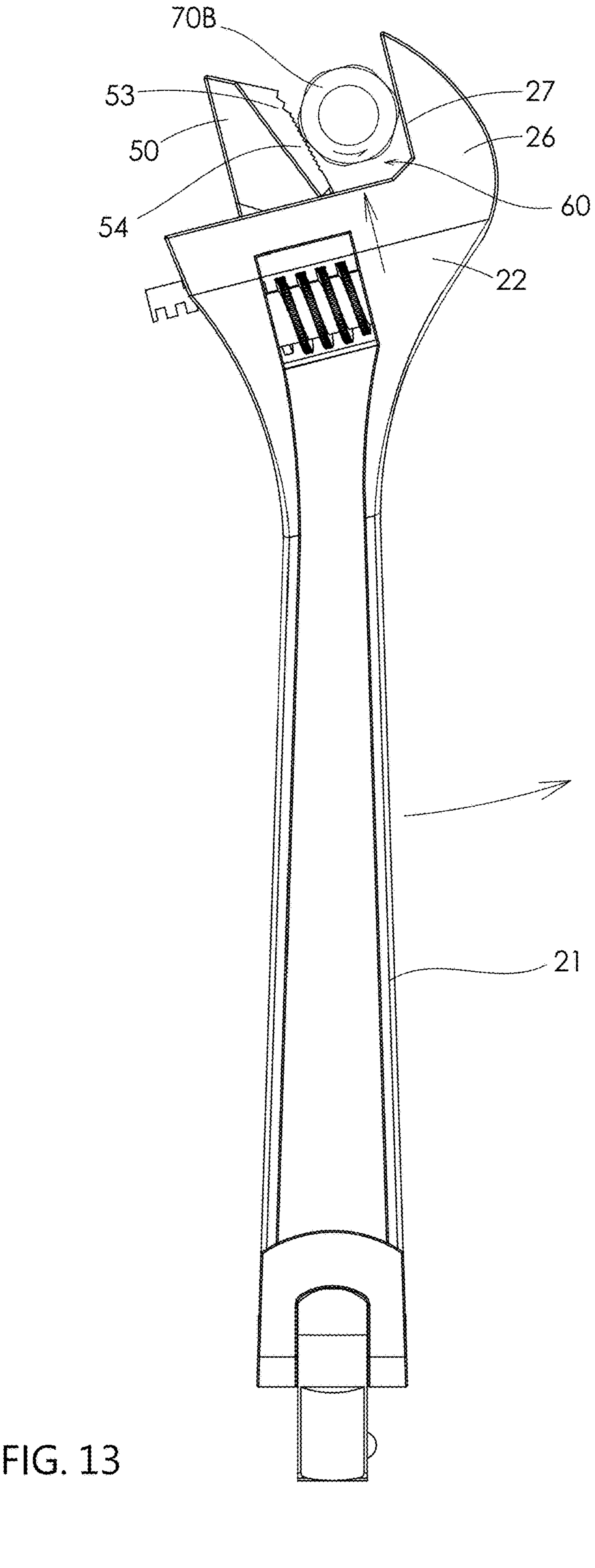
FIG. 13 is a schematic view of the present invention, wherein the wrench is used to grip and turn a nut with worn corners.
Figure 14:
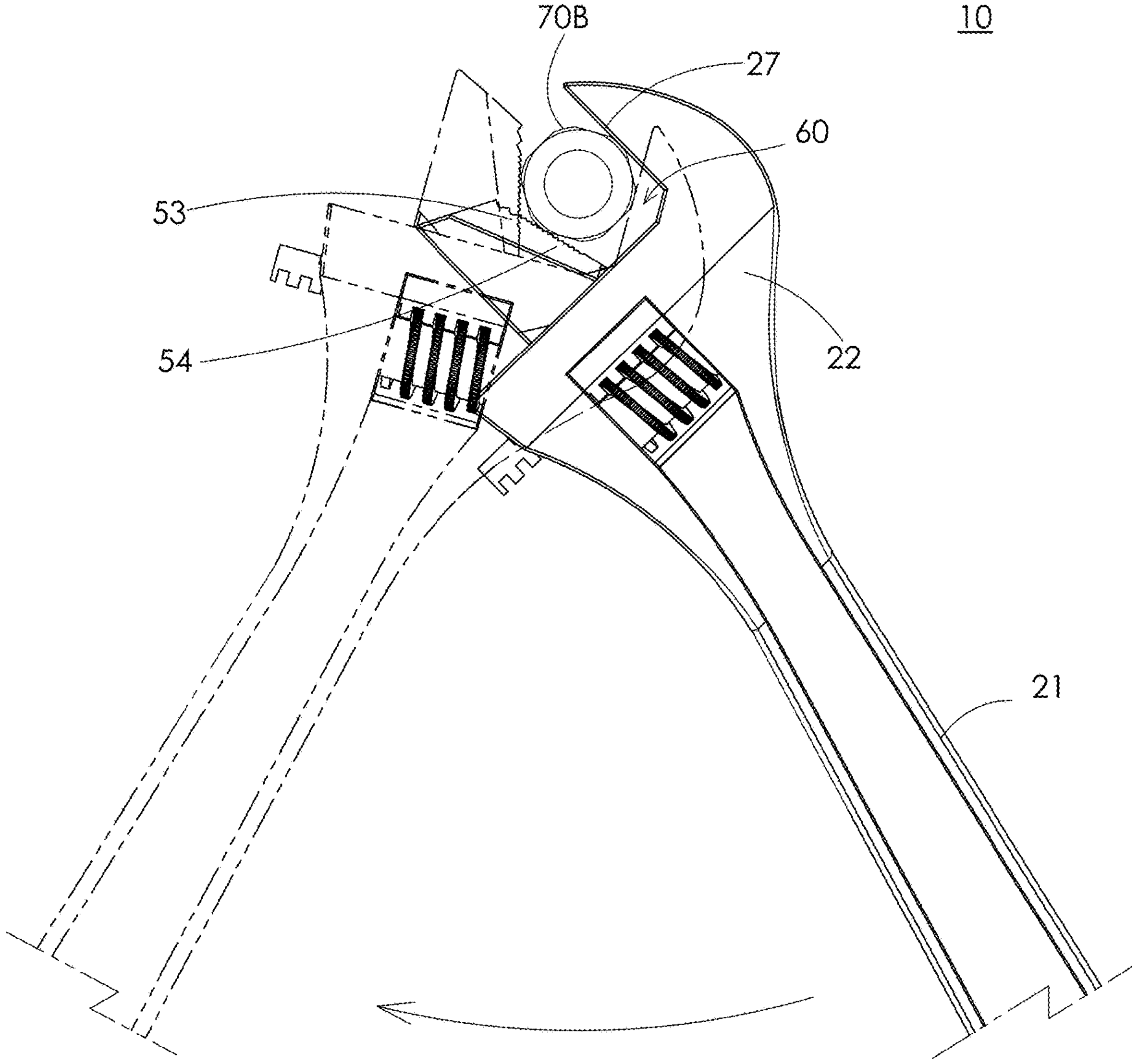
FIG. 14 is a schematic view of the present invention, wherein the wrench is swung back after the nut with worn corners is turned by an angle.
Figure 15:
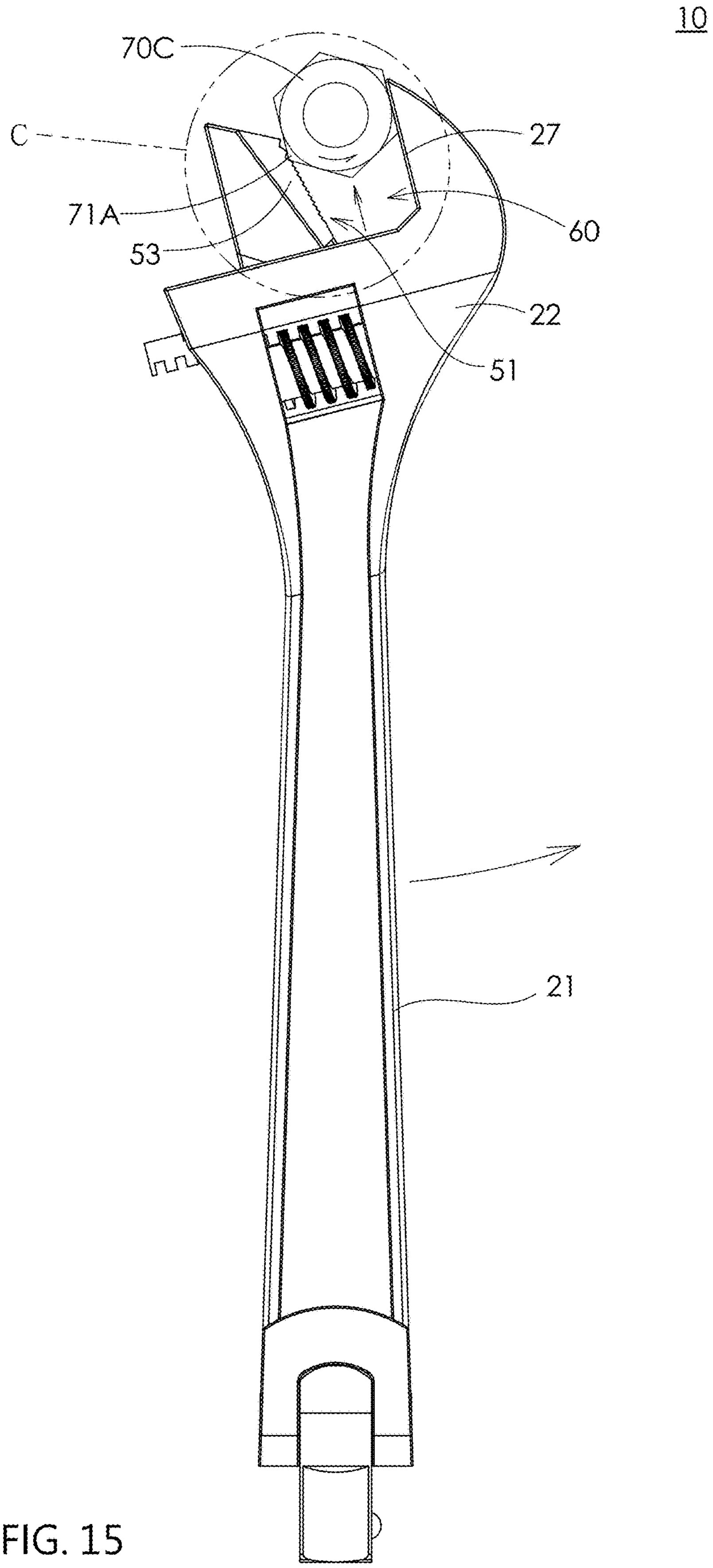
FIG. 15 is a schematic view of the present invention, wherein the wrench is used to grip and turn a hexagonal nut.
Figure 16:
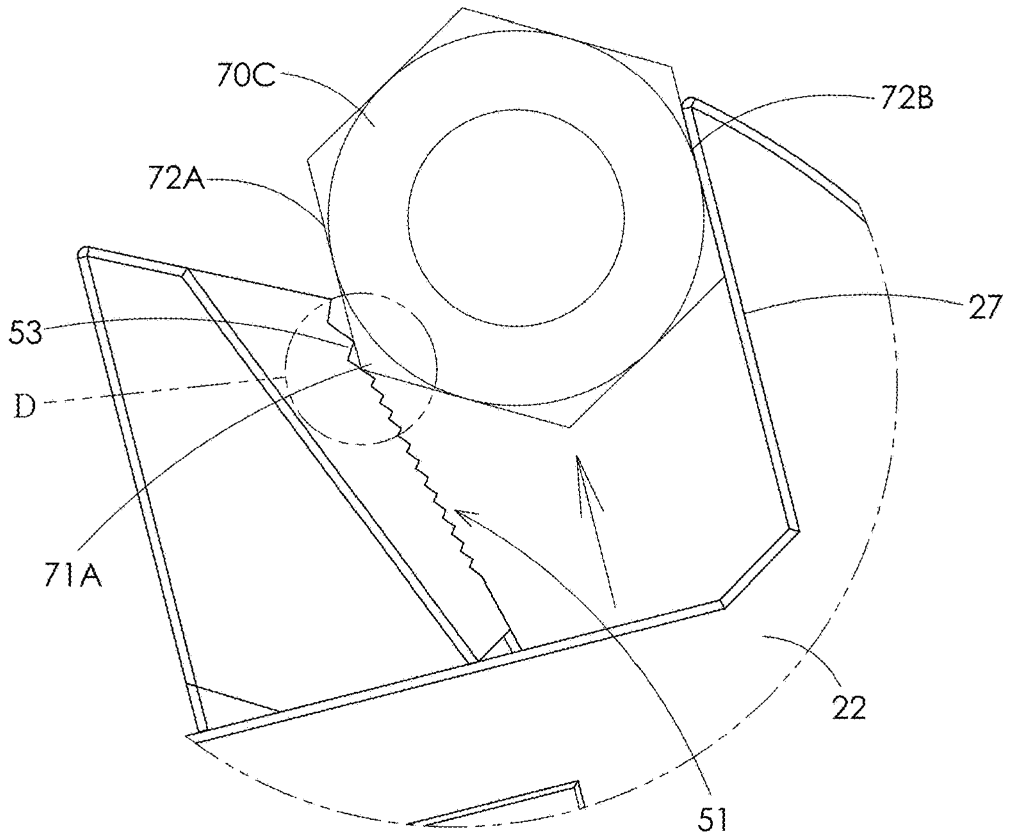
FIG. 16 is an enlarged view of circle C in FIG. 15.
Figure 17:
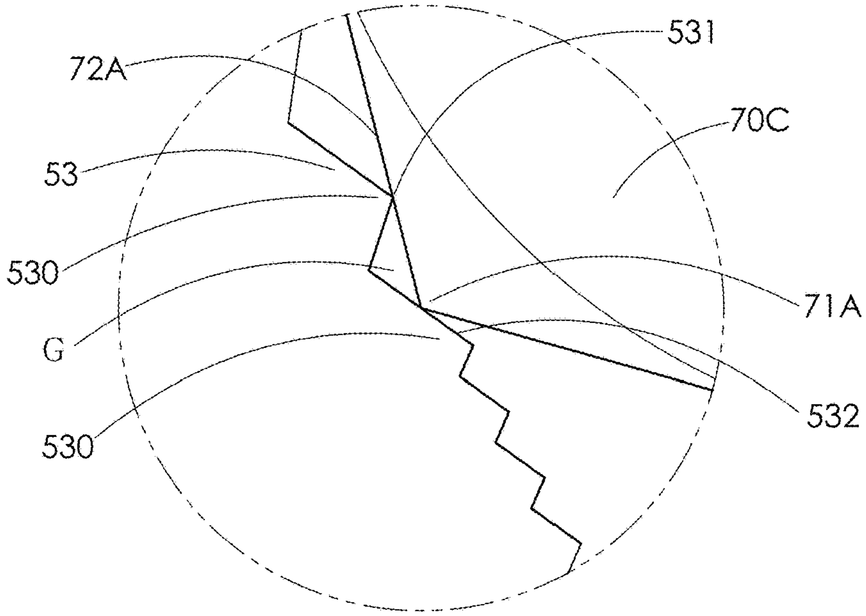
FIG. 17 is an enlarged view of circle D in FIG. 16.
Figure 18:
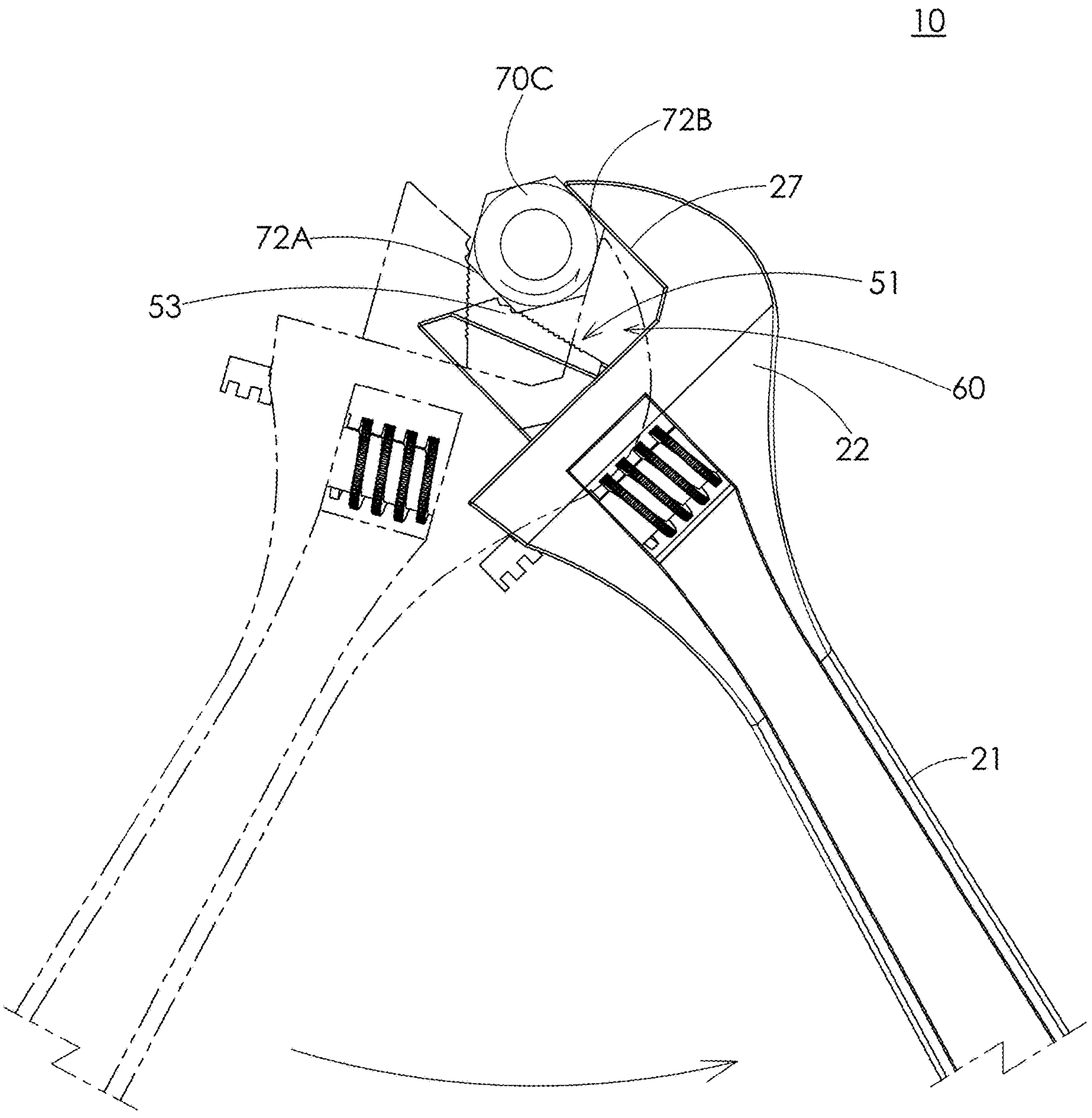
FIG. 18 is a schematic view of the present invention, wherein the hexagonal nut is turned by an angle.
Figure 19:
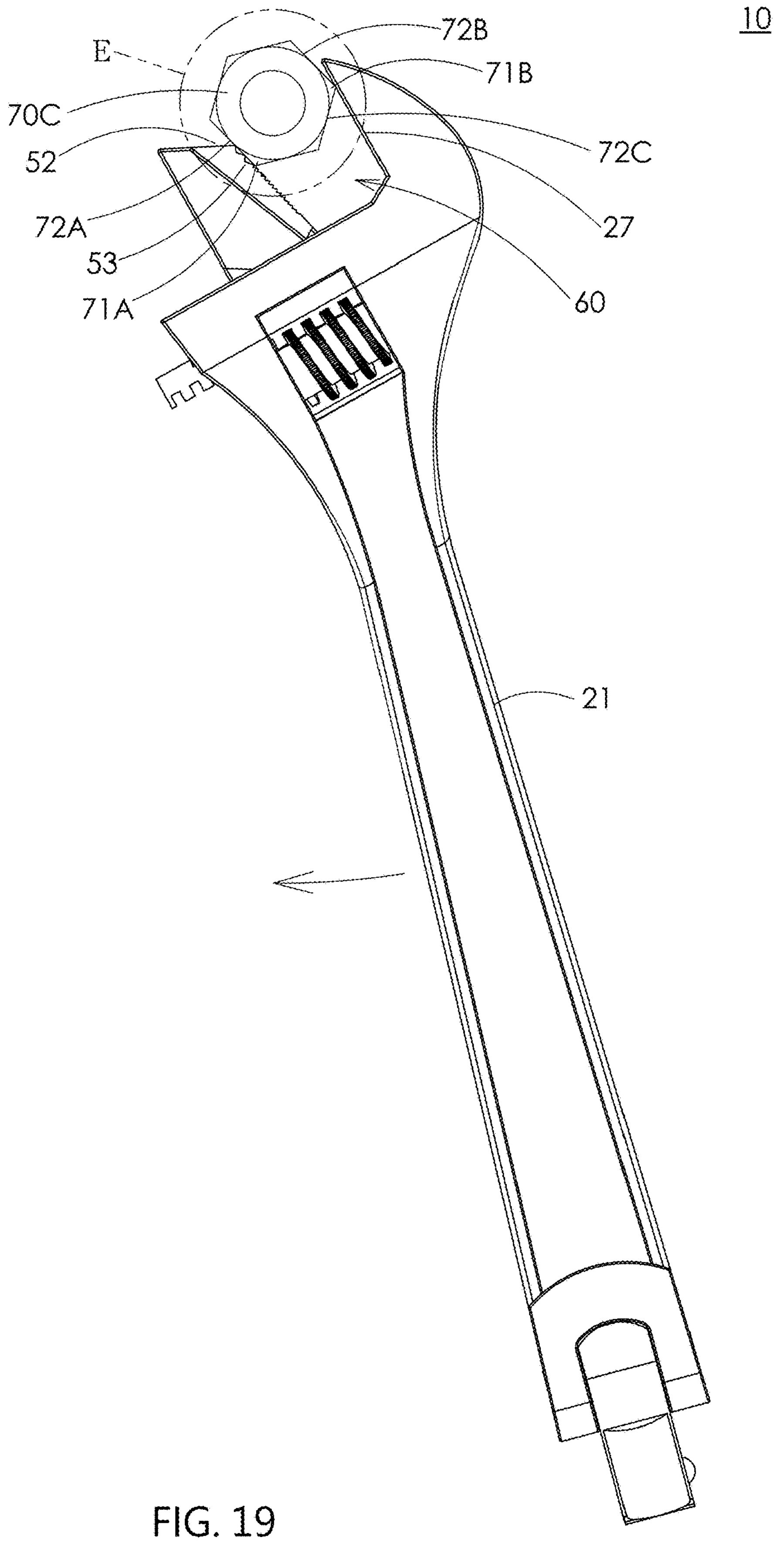
FIG. 19 is a schematic view of the present invention, wherein the wrench is swung back 15 degrees after the hexagonal nut is turned by an angle.
Figure 20:
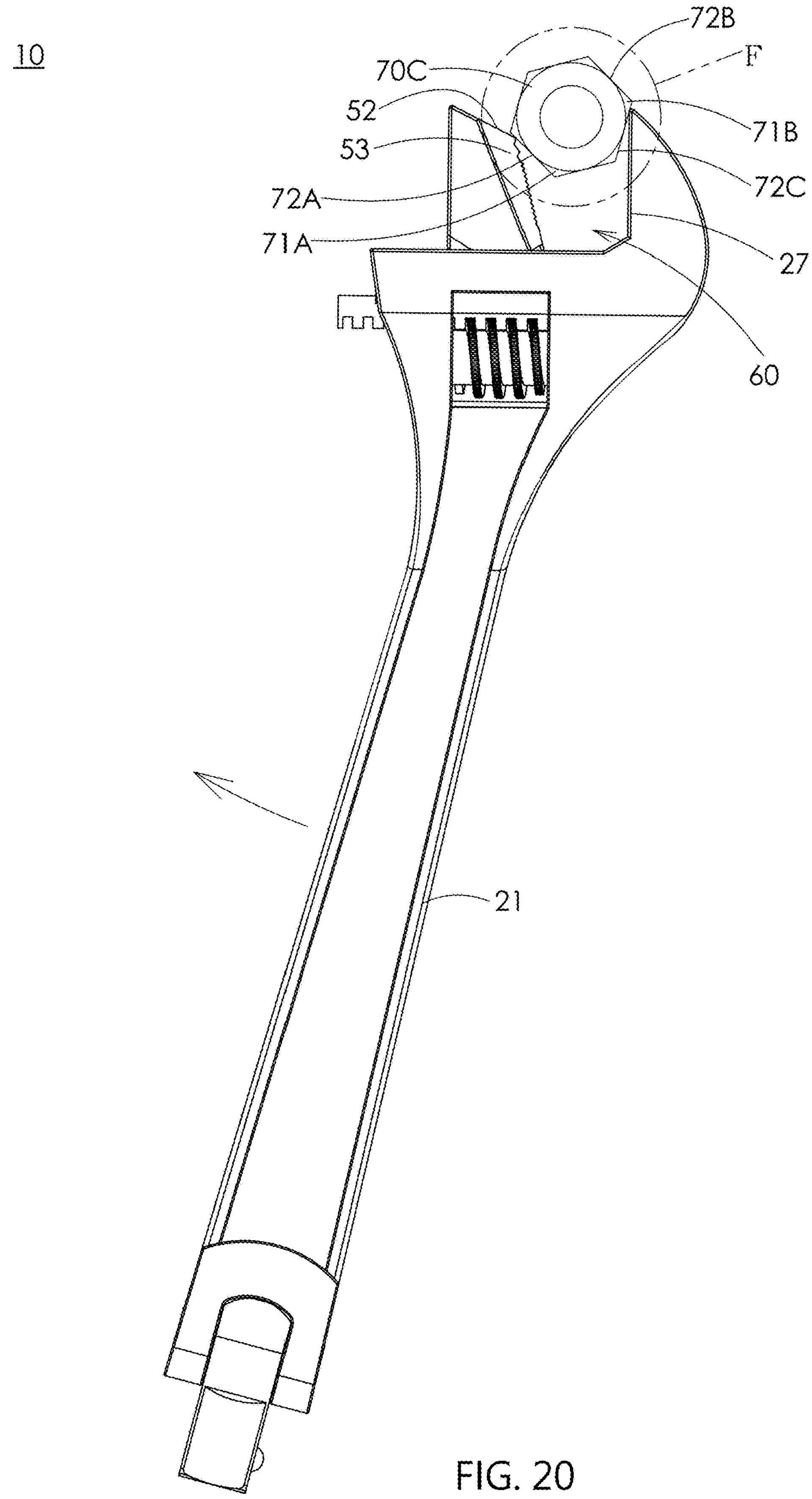
FIG. 20 is a schematic view of the present invention, wherein the wrench is swung back 30 degrees after the hexagonal nut is turned by an angle.
Figure 21:
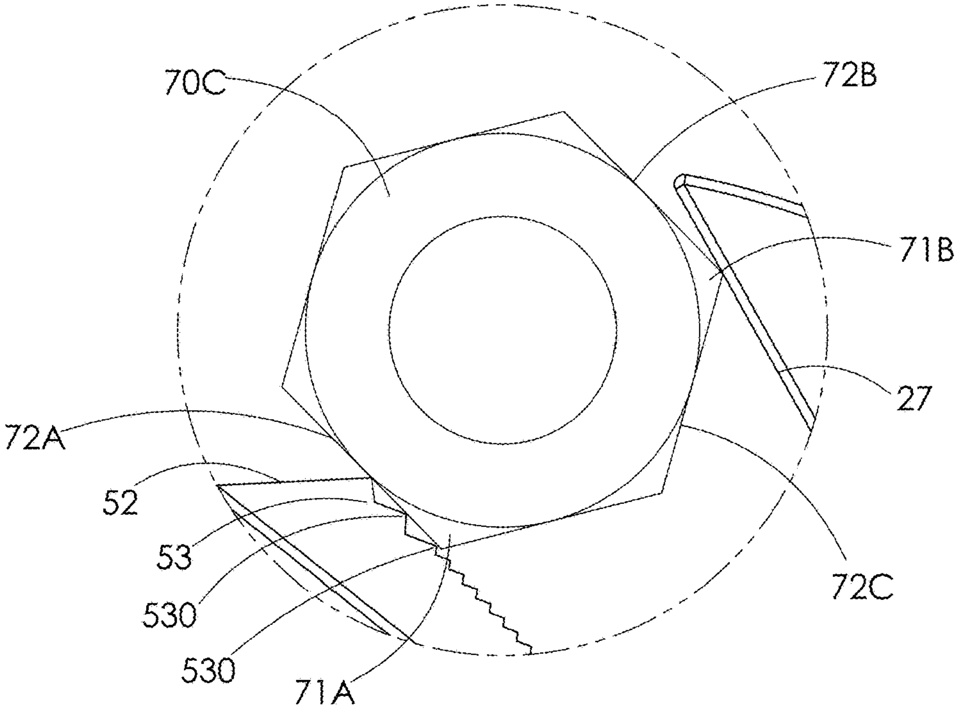
FIG. 21 is an enlarged view of circle E in FIG. 19.
Figure 22:
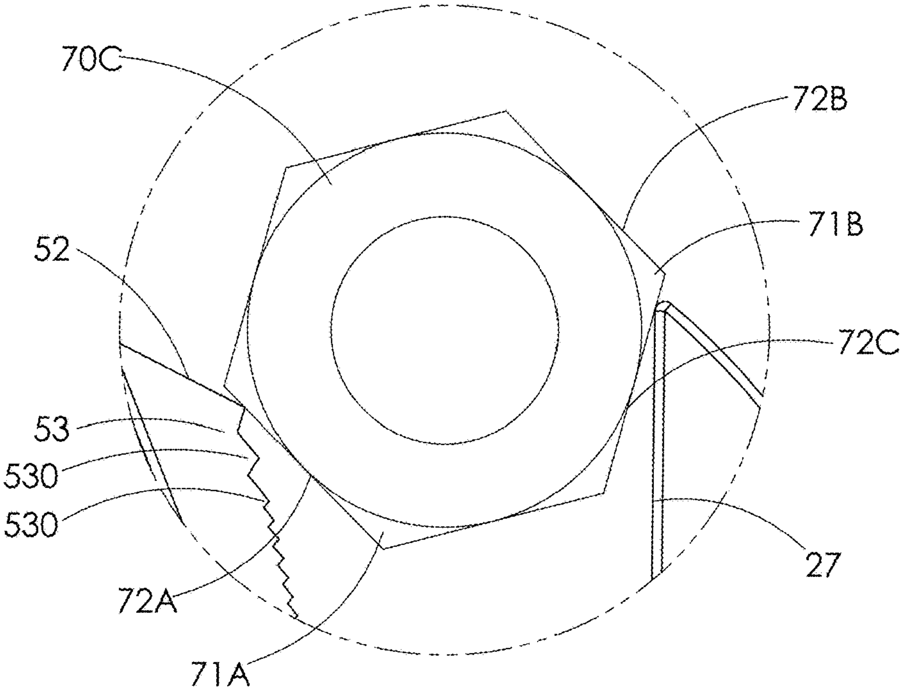
FIG. 22 is an enlarged view of circle F in FIG. 20.

When in use, as shown in FIG. 11, the first gripping surface 27 and the second gripping surface 51 of the fixed jaw 26 and the jaw body 50 of the movable jaw 40 grip a workpiece together, i.e., in the figure, a round pipe workpiece 70A is gripped as an example. As shown in the figures of this embodiment, the workpiece 70A is turned counterclockwise. If the workpiece 70A is to be turned clockwise, the wrench 10 is operated reversely, which will not be described again here. When the user holds the handle 21 of the wrench 10 and operates the first jaw head 22 to turn the workpiece 70A counterclockwise and applies thrust toward the workpiece 70A, the gripping opening inclination $\alpha_1$ (referring to FIG. 9 and FIG. 10) of the second gripping surface 51 will provide a compressing and tightening effect, that is, the anti-slip teeth 540 of the anti-slip surface section 54 and/or the biting teeth 530 of the biting surface section 53 will drive the workpiece 70A to rotate. After the workpiece 70A is turned by an angle, the jaw opening 60 will retreat from the workpiece 70A, stopping the turning of the workpiece 70A (not shown in the figure). As shown in FIG. 12, the first jaw head 22 may be swung back by the handle 21 without applying thrust to the workpiece 70A, and then continue to turn the workpiece 70A as shown in FIG. 11. As shown in FIG. 11, the worm 30 can be rotated to adjust the jaw opening 60. The wrench 10 can be used to turn various rod-shaped or pipe-shaped workpieces 70A, regardless of whether the cross-section of the workpiece is round, polygonal or other special shape. This operating mode may be applied to bolt/nut workpieces 70B with severely worn corners as shown in FIG. 13 and FIG. 14. The workpiece 70B can be disassembled or loosened effectively. In general, as shown in FIG. 15, for the hexagonal bolt/nut workpiece 70C with normal corners, the first jaw head 22 is moved forward, and the first gripping surface 27 and the second gripping surface 51 grip two opposite sides of the workpiece 70B. As shown in FIG. 16 and FIG. 17, the corner 71A of the workpiece 70C will be received in the tooth gap G between two of the biting teeth 530 of the biting surface section 53. That is, the tips 531 of two of the biting teeth 530 are against the side 72A of the workpiece 70C and the corner 71A of the workpiece 70C is against the back face 532, thereby forming two supports. As shown in FIG. 16, FIG. 17, and FIG. 18, when the first jaw head 22 is turned, the first gripping surface 27 and the second gripping surface 51 grip the two sides 72A, 72B of the workpiece 70C, that is, the biting surface section 53 bites the corner 71A of the workpiece 70C to turn, without slipping or wearing. Besides, the first jaw head 22 can be swung back by the handle 21 at any angle. As shown in FIGS. 19 to 22, the biting teeth 530 of the biting surface section 53 are disengaged from the corner 71A of the workpiece 70C, and the intersection of the biting surface section 53 and the guide surface 52 is moved along the side 72A of the workpiece 70C, and the first gripping surface 27 passes through the corner 71B on the other side 72B of the workpiece 70C smoothly to another adjacent side 72C, returning to the initial gripping state as shown in FIG. 15. As shown in FIGS. 15, 18, 19, and 20, there is no need for the jaw opening 60 of the wrench 10 to retreat from the workpiece 70C, and the workpiece 70C can be disassembled or locked quickly. The wrench, as shown in FIG. 11 and FIG. 13, may be used to turn or disassemble various rod-shaped or pipe-shaped workpieces 70A or bolt/nut workpieces 71B with worn corners. As shown in FIG. 15, when the wrench is used to turn normal hexagonal bolt/nut workpieces 70B with unworn corners, it has a quick-release or quick-lock function, without wearing corners.

According to the above embodiment, preferably, as shown in FIG. 9 and FIG. 10, the tooth pitch $D_1$ of every adjacent two of the biting teeth 530 of the biting surface section 53 is 2 mm to 2.5 mm. The tooth height $H_2$ of the biting teeth 530 is 0.65 mm to 0.85 mm. The tooth back inclination $\alpha_3$ is 60 degrees to 70 degrees. As shown in FIGS. 15 to 22, the biting surface section 53 has good ability to bite and turn the corner 71A of various hexagonal bolt/nut workpieces 70B.

According to the above embodiment, preferably, as shown in FIG. 9 and FIG. 10, the gripping surface length L of the second gripping surface 51 is 0.75 to 0.85 times the jaw body height $H_1$. The anti-slip surface section 54 is 3 to 3.5 times the biting surface section 53 in length. As shown in FIG. 15, the biting surface section 53 is configured to bite and turn the corner 71A of a hexagonal bolt or nut. As shown in FIG. 11, there is no need for the worm 30 to adjust the jaw opening 60. As long as the rod-shaped or pipe-shaped workpiece 70A is in the jaw opening 60, it can be turned effectively.

According to the above embodiment, preferably, as shown in FIG. 9 and FIG. 10, the gripping opening inclination $\alpha_1$ of the second gripping surface 51 is 14 degrees to 15 degrees. Thus, as shown in FIG. 11, when the first jaw head 22 is pushed forward toward the rod-shaped or pipe-shaped workpiece 70A, the first gripping surface 27 and the second gripping surface 51 provide a compressing and tightening effect.

Figure 23:
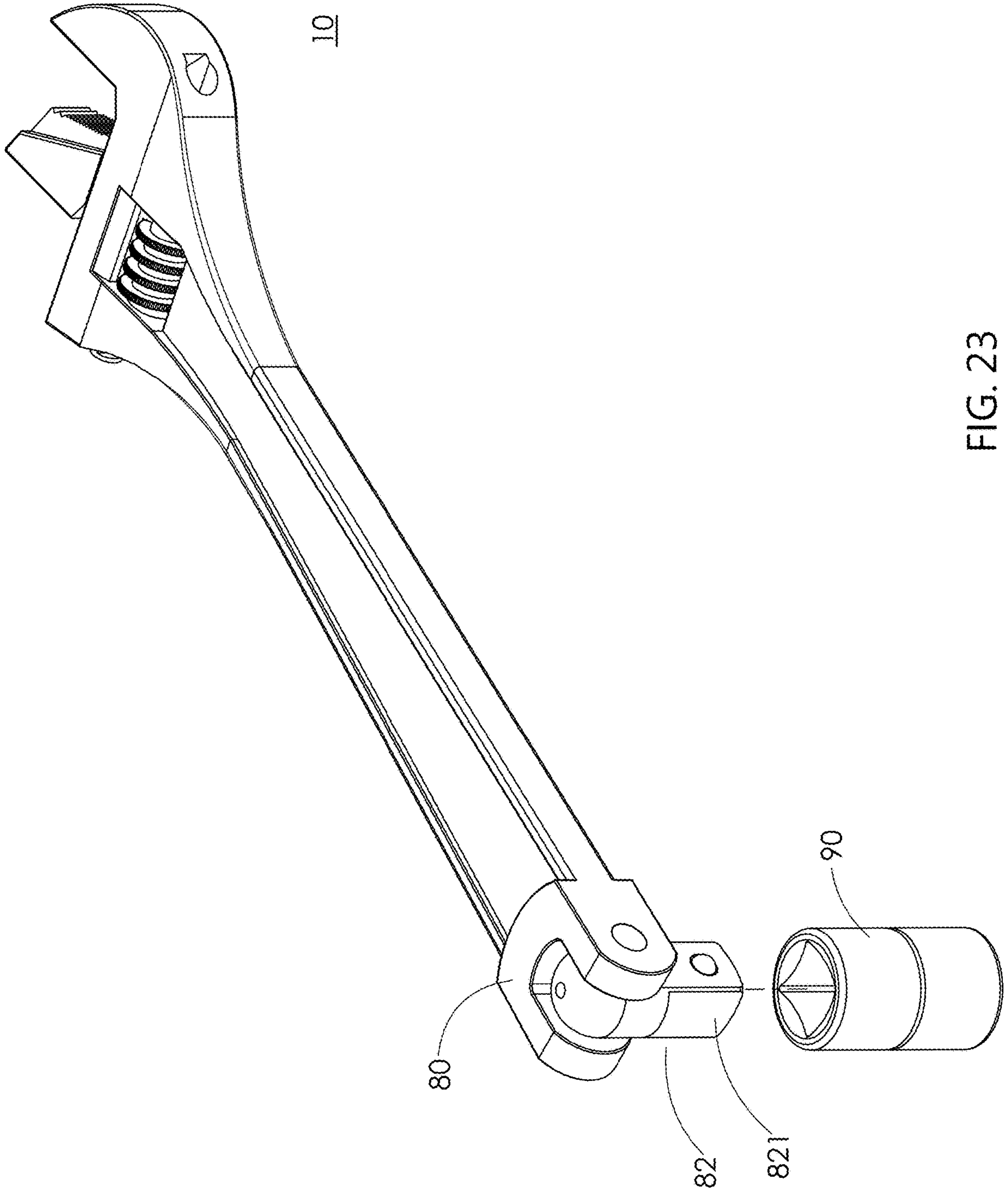
FIG. 23 is a perspective view of the present invention connected with a socket.

According to the above embodiment, preferably, as shown in FIG. 6, FIG. 7 and FIG. 8, a second jaw head 80 is provided at the other end of the handle 20 of the wrench body 20. The second jaw head 80 is horseshoe-shaped and has a U-shaped notch 81. A socket connector 82 is pivotally connected to the U-shaped notch 81. One end of the socket connector 82 has a pivot portion 820 that is pivotally connected to the U-shaped notch 81. The other end of the socket connector 82 has a socket connecting portion 821. As shown in FIG. 23, the socket connector 82 can be pivoted on the second jaw head 80, and a socket 90 is connected to the socket connecting portion 821 so that the wrench 10 can be used as a socket wrench.

Figure 24:
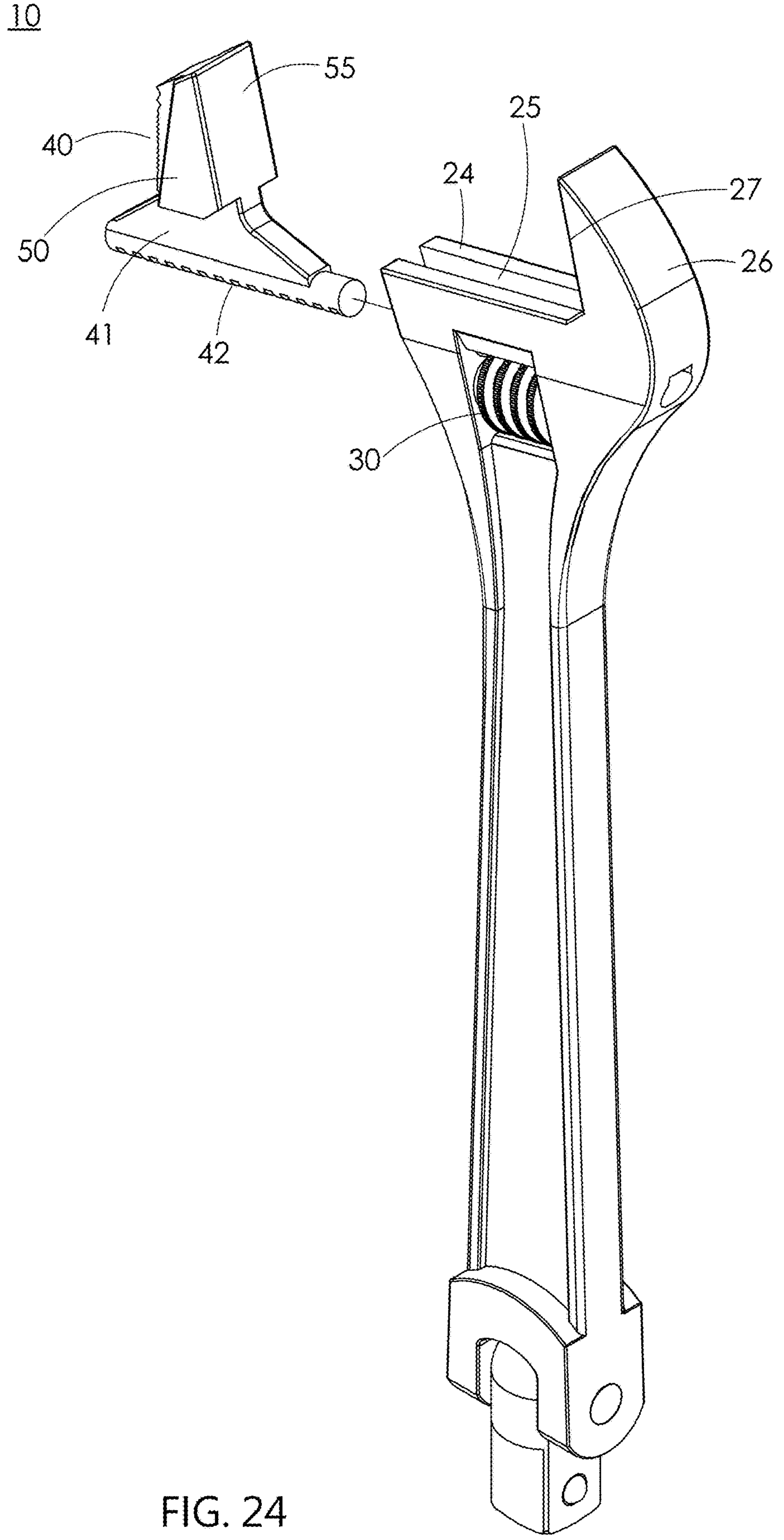
FIG. 24 is a perspective view of the present invention, wherein the third gripping surface is selected to face the first gripping surface before the guide plate portion of the movable jaw is inserted in the guide rail.
Figure 25:
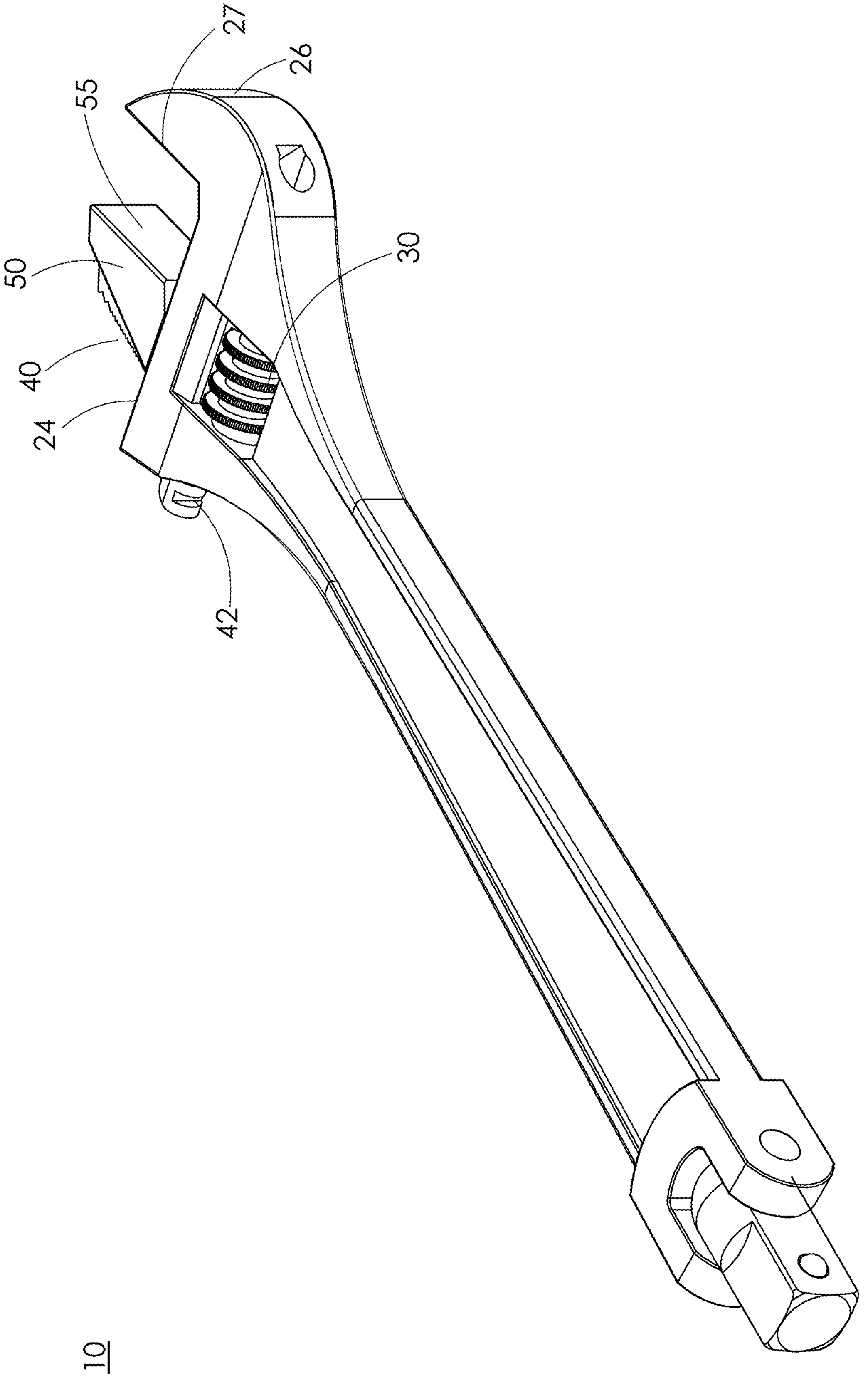
FIG. 25 is a perspective view of the present invention used as an open-ended adjustable wrench.

According to the above embodiment, preferably, as shown in FIG. 6, the second gripping surface 51 of the jaw body 50 of the movable jaw 40 faces the first gripping surface 27 of the fixed jaw 26. The jaw body 50 further has a third gripping surface 55 facing away from the first gripping surface 27, that is, the third gripping surface 55 is opposite to the second gripping surface 51. The third gripping surface 55 is parallel to the first gripping surface 27. As shown in FIG. 24 and FIG. 25, when the guide plate portion 41 of the movable jaw 40 is inserted in the guide groove 25 and the rack 42 meshes with the worm 30, the third gripping surface 55 is selected to face the first gripping surface 27. The worm 30 is rotatable to drive the jaw body 50 to move along the slide surface 24 closer to or away from the fixed jaw 26, thereby adjusting the jaw opening between the first gripping surface 27 and the third gripping surface 55, such that the wrench 10 may be used as an open-end adjustable wrench.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A universal adjustable wrench, comprising:

a wrench body, including a handle and a first jaw head at one end of the handle, a worm groove being defined in the first jaw head, a slide surface being formed on a front end of the first jaw head, the slide surface having a rail groove that is tangent to the worm groove, a fixed jaw being formed on one end of the slide surface, the fixed jaw having a first gripping surface perpendicular to the slide surface, a gripping depth being defined from an outermost point of the first gripping surface to the slide surface;

a worm, pivotally connected in the worm groove;

a movable jaw, having a guide plate portion inserted in the rail groove, a jaw body extending outwardly relative to the slide surface being formed on one end of the guide plate portion, a rack meshing with the worm being formed on another end of the guide plate portion, the worm being rotatable to drive the jaw body to move along the slide surface closer to or away from the fixed jaw; a distance between an outermost end of the jaw body and the slide surface being defined as a jaw body height, the jaw body height being equivalent to the gripping depth, the jaw body having a second gripping surface and a guide surface relative to the first gripping surface, a jaw opening being defined between the second gripping surface and the first gripping surface; a line that passes through an intersection of the second gripping surface and the slide surface and is parallel to the first gripping surface being defined as a gripping opening reference line, a gripping alignment line being defined on the second gripping surface; an angle between the gripping alignment line and the gripping opening reference line being 13 degrees to 16 degrees and defined as a gripping opening inclination, the second gripping surface having a gripping surface length that is 0.65 to 0.9 times the jaw body height; the guide surface intersecting the outermost end of the jaw body, an angle between the guide surface and the gripping alignment line being defined as a guide angle, the guide angle being 30 degrees to 75 degrees, the second gripping surface including a biting surface section and an anti-slip surface section that are arranged in sequence in an outside-in direction; the biting surface section having at least two biting teeth that are connected in sequence and extend laterally, the biting teeth each having a tip, a distance between the tips of every adjacent two of the biting teeth being defined as a tooth pitch, the tips of the biting teeth being aligned with the gripping alignment line, a line perpendicular to the gripping alignment line at the tip being defined as a tooth profile reference line, the biting teeth each having a root, a line extending along the roots of the biting teeth being defined as a root line, the root line being parallel to the gripping alignment line, a distance between the gripping alignment line and the root line being defined as a tooth height, the tooth pitch being 1.5 mm to 3 mm and being 1.5 to 3 times the tooth height, the biting teeth each having a back face extending and inclining outwardly from the tip to the root line and a front face extending and inclining inwardly from the tip to the root line, an angle between the back face and the tooth profile reference line being defined as a tooth back inclination, an angle between the front face and the tooth profile reference line being defined as a tooth height inclination, the tooth back inclination being more than 1.25 times the tooth height inclination; the anti-slip surface section being connected to the biting surface section, the anti-slip surface section having a plurality of anti-slip teeth that are connected in sequence and extend laterally, the anti-slip teeth each having a tip, the tips of the anti-slip teeth being aligned with the gripping alignment line, the anti-slip teeth each have a tooth profile approximately equivalent to that of the biting teeth, the anti-slip teeth having a tooth pitch and a tooth height, the tooth pitch and the tooth height of the anti-slip teeth being two-fifths to three-fifths of the tooth pitch and the tooth height of the biting teeth, respectively.

2. The universal adjustable wrench as claimed in claim 1, wherein the tooth pitch of every adjacent two of the biting teeth of the biting surface section is 2 mm to 2.5 mm, the tooth height of the biting teeth is 0.65 mm to 0.85 mm, and the tooth back inclination is 60 degrees to 70 degrees.

3. The universal adjustable wrench as claimed in claim 1, wherein the gripping surface length of the second gripping surface is 0.75 to 0.85 times the jaw body height, and the anti-slip surface section is 3 to 3.5 times the biting surface section in length.

4. The universal adjustable wrench as claimed in claim 1, wherein the gripping opening inclination of the second gripping surface is 14 degrees to 15 degrees.

5. The universal adjustable wrench as claimed in claim 1, wherein a second jaw head is provided at another end of the handle of the wrench body, the second jaw head is horseshoe-shaped and has a U-shaped notch, a socket connector is pivotally connected to the U-shaped notch, one end of the socket connector has a pivot portion that is pivotally connected to the U-shaped notch, and another end of the socket connector has a socket connecting portion.

6. The universal adjustable wrench as claimed in claim 1, wherein the second gripping surface of the jaw body of the movable jaw faces the first gripping surface of the fixed jaw, the jaw body further has a third gripping surface facing away from the first gripping surface, and the third gripping surface is parallel to the first gripping surface.

* * * * *